United States Patent [19]
Tenmyo

[11] Patent Number: 6,078,752
[45] Date of Patent: *Jun. 20, 2000

[54] ILLUMINATING DEVICE AND PHOTOGRAPHING APPARATUS

[75] Inventor: Yoshiharu Tenmyo, Yokohama, Japan

[73] Assignee: Canon Kabushiki Kaisha

[ * ] Notice: This patent issued on a continued prosecution application filed under 37 CFR 1.53(d), and is subject to the twenty year patent term provisions of 35 U.S.C. 154(a)(2).

[21] Appl. No.: 08/941,632

[22] Filed: Oct. 2, 1997

[30] Foreign Application Priority Data

Oct. 9, 1996 [JP] Japan ................................ 8-287690

[51] Int. Cl.⁷ .................................................. G03B 15/03
[52] U.S. Cl. ............................................ 396/176; 362/16
[58] Field of Search ................... 396/176, 177, 396/178, 155; 362/16, 17, 18

[56] References Cited

U.S. PATENT DOCUMENTS

| | | | |
|---|---|---|---|
| 3,711,701 | 1/1973 | Squyres | 355/67 X |
| 3,756,719 | 9/1973 | Harter | 355/67 X |
| 3,913,872 | 10/1975 | Weber | 355/67 X |
| 4,547,044 | 10/1985 | Jain et al. | 350/433 |
| 4,568,179 | 2/1986 | Durbin et al. | 355/67 |
| 5,394,307 | 2/1995 | Matsuura | 362/16 |
| 5,408,572 | 4/1995 | Kriege | 385/43 |
| 5,459,592 | 10/1995 | Shibatani et al. | 359/40 |
| 5,506,929 | 4/1996 | Tai et al. | 385/146 |

FOREIGN PATENT DOCUMENTS

| | | |
|---|---|---|
| 0 729 059 A1 | 8/1996 | European Pat. Off. . |
| 2 657 971 | 8/1991 | France . |
| 42 25 323 C1 | 5/1993 | Germany . |
| 57-150826 | 9/1982 | Japan . |
| 59-165037 | 9/1984 | Japan . |
| 60-177410 | 11/1985 | Japan . |
| 4-138438 | 5/1992 | Japan . |
| 4-147118 | 5/1992 | Japan . |
| 4-204924 | 7/1992 | Japan . |
| 8-334811 | 8/1996 | Japan . |
| 8-234277 | 9/1996 | Japan . |
| 9-179171 | 7/1997 | Japan . |

OTHER PUBLICATIONS

European Search Report dated Mar. 4, 1998.

*Primary Examiner*—W. B. Perkey
*Attorney, Agent, or Firm*—Fitzpatrick, Cella, Harper & Scinto

[57] ABSTRACT

A flash device comprises a light source and an optical system for projecting light emitted from the light source onto an object, the optical system having a transparent member which is tapered toward the light source. The transparent member has an entrance surface, an exit surface opposed to the entrance surface, and a reflecting surface lying between the entrance surface and the exit surface. Part of the light emitted from the light source is made incident on the entrance surface and then exits from the exit surface after having been reflected at the reflecting surface.

82 Claims, 17 Drawing Sheets

ILLUMINATING DEVICE AND PHOTOGRAPHING APPARATUS

BACKGROUND OF THE INVENTION

1. Field of the Invention

The present invention relates to an illuminating device and a photographing apparatus and, more particularly, to an optical apparatus suitable for efficiently projecting illuminating light (flash light) onto an object in interlocking relation to the photographing operation of a camera body in the state of being fitted in a part of the camera body.

2. Description of Related Art

Various illuminating devices (flash devices) all are of the type which is fitted in a part of a camera body and projects illuminating light (flash light) toward an object side in interlocking relation to the photographing operation of the camera body.

For example, Japanese Laid-Open Utility Model Application No. Sho 57-150826 proposes an illuminating device which is arranged in such a manner that, during use, an emission part is held and fixed at a position distant from the photographing optical axis of a camera, and during nonuse, the emission part is tilted to the front and integrated into the shape of the camera.

Japanese Laid-Open Patent Application No. Sho 59-165037 proposes an illuminating device which is arranged to obtain a predetermined light distribution through a plurality of fiber bundles which are appropriately disposed at a light-gathering portion in which light beams emitted from a flash discharge tube are gathered in a band-like form.

Japanese Laid-Open Patent Application No. Hei 8-234277 proposes an illuminating device which comprises emission means and an optical member for projecting light emitted from the emission means onto an object, the optical member being arranged to guide the emitted light through the optical member in the longitudinal direction thereof and bend and gather the light and project it toward an object.

In general, it has been desired that an illuminating device (flash device) to be fitted into a small-size light-weight photographing apparatus such as a camera have the following features and the like.

(a1) Small size and light weight.

(a2) Illuminating light emitted from light source means can be efficiently projected toward an object side.

BRIEF SUMMARY OF THE INVENTION

It is, therefore, an object of the present invention to provide an improved illuminating device such as a flash device which can use light with high efficiency.

Another object of the present invention is to provide a photographing apparatus, such as a still camera, a digital camera or a video camera, which has an improved flash device capable of using light with high efficiency.

The present invention provides an arrangement which comprises a light source and an optical system for projecting light emitted from the light source onto an object, and the optical system has a transparent member which is tapered toward the light source. The tapered transparent member has an entrance surface, an exit surface opposed to the entrance surface, and a reflecting surface lying between the entrance surface and the exit surface. The light emitted from the light source is made incident on the entrance surface and then exits from the exit surface after having been reflected at the reflecting surface.

According to the present invention, the optical system does or does not have a concave mirror for reflecting the light emitted from the light source toward the entrance surface.

According to the present invention, the transparent member is made of plastics or glass.

According to the present invention, the reflecting surface is formed by a total reflection surface, or a surface having a reflecting film, or a surface having both surfaces.

According to the present invention, the entrance surface does or does not have a positive refractive power (the value of focal length is not infinity but a positive finite value).

According to th e present invention, the exit surface does or does not have a positive refractive power.

According to one aspect of the present invention, the exit surface has a convex surface having the positive refractive power in its central portion and an inclined plane surface in its marginal portion.

Another aspect of the present invention has a Fresnel lens having a positive refractive power, or the Fresnel lens is formed on the exit surface, or the Fresnel lens is provided in the vicinity of the exit surface.

According to another aspect of the present invention, the exit surface has a plurality of convex surfaces each having the positive refractive power and the same or different curvature.

According to another aspect of the present invention, an optical axis of the exit surface having the positive refractive power is inclined or decentered in parallel with respect to an optical axis of the optical system.

According to another aspect of the present invention, the exit surface has a plane surface inclined with respect to an optical axis of the optical system, and the inclined plane surface deflects entire light beams exiting therefrom.

Another aspect of the present invention further comprises means for scattering light emitted from the light source, the means being provided on or near the entrance surface.

According to another aspect of the present invention, the exit surface has a rectangular shape, and the entrance surface also has a rectangular shape.

According to another aspect of the present invention, the light source has a flash discharge tube which extends in a direction perpendicular to an optical axis of the optical system, and the optical system extends in the perpendicular direction and has a reflecting mirror for reflecting the light emitted from the flash discharge tube toward the transparent member. The transparent member is a plate-shaped member parallel to a plane which contains the perpendicular direction, the entrance surface and the exit surface having rectangular shapes each of which is long in the perpendicular direction. Letting HL be an arc length of the flash discharge tube, letting H1 and H2 be an inner diameter and an outer diameter of the flash discharge tube, respectively, letting DX be a length of the entrance surface in the perpendicular direction, and letting DY be a length of the entrance surface in a direction perpendicular to the perpendicular direction, the following conditions are satisfied:

$H1 \leq DY \leq 2 \times H2$, $HL \leq DX \leq HL+8$. (Unit: mm)

Letting $\beta$ be an inclination angle of the reflecting surface with respect to the entrance surface (if the reflecting surface is a curved surface, an inclination angle of a tangent to the curved surface with respect to the entrance surface) and letting n be a refractive index of the transparent member, the following condition is satisfied:

$$\{\sin^{-1}(1/n)\}/3 \leq \beta.$$

The exit surface has a convex curved surface, and letting α be an inclination angle of a tangent to the convex curved surface with respect to a plane perpendicular to the entrance surface, letting β be an inclination angle of the reflecting surface with respect to the entrance surface (if the reflecting surface is a curved surface, an inclination angle of a tangent to the curved surface with respect to the entrance surface), letting $\theta_{max}$ be a maximum incident angle of the light emitted from the light source with respect to the entrance surface, and letting n be a refractive index of the transparent member, the following condition is satisfied:

$$\alpha \leq 2\beta - \sin^{-1}((\sin \theta_{max})/n) + \sin^{-1}(1/n).$$

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below with reference to the accompanying drawings.

Figure 1:
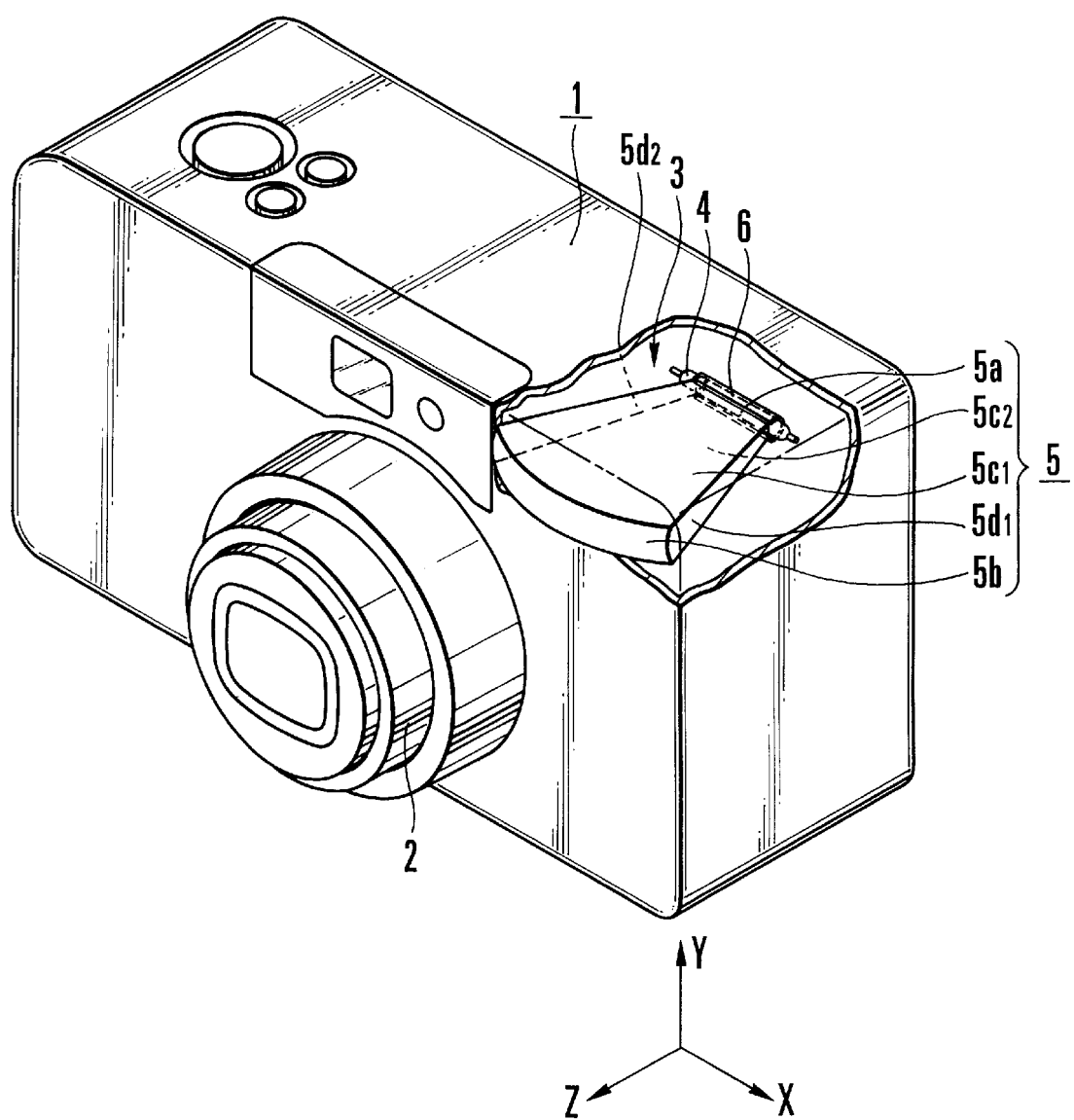
FIG. 1 is a diagrammatic perspective view of the essential portions of an illuminating device according to a first embodiment of the present invention, which is provided in a top portion of a camera body.

FIG. 1 is a diagrammatic perspective view showing the essential portions of a first embodiment in which an illuminating device according to the present invention is provided in a top portion of the body of a camera (a photographing apparatus). FIGS. 2 to 7 are cross-sectional views showing the essential portions of different types of optical members for guiding illuminating light beams in the illuminating device shown in FIG. 1.

The camera shown in FIG. 1 includes a camera body 1 (the body of the photographing apparatus) and a lens barrel part 2 which holds a photographing lens. The vertical and horizontal directions of the camera body 1 and the direction of the optical axis thereof will be hereinafter referred to as the Y axis, the X axis and the Z axis, respectively.

An illuminating device (an emission-part unit) 3 is provided in a top right portion of the camera body 1 for sliding movement in the horizontal direction (the X direction) or in the vertical direction (the Y direction). The illuminating device 3 includes a cylindrical flash discharge tube (light source means) 4 for emitting flash light, a reflecting mirror (a reflector) 6 for gathering and reflecting toward an object side the light beams radiated in various directions other than the forward direction from the flash discharge tube 4, for example, the light beams radiated in the rearward direction (in the opposite direction to the object side), the reflecting mirror 6 having a curvature in a one-dimensional direction and being arranged to reflect light at its internal surface, and an illuminating-light-beam guiding optical member (a light guide) 5 for gathering both light beams which have entered the optical member 5 directly from the flash discharge tube 4 and the light beams which have entered the optical member 5 after having been reflected from the reflecting mirror 6, and efficiently projecting a light beam of predetermined shape toward the object side.

The optical member 5 is a plate-shaped transparent member made of glass, plastics or the like. The optical member 5 includes an entrance surface 5a through which light beams are allowed to enter the optical member 5 from the side of the flash discharge tube 4, top and bottom surfaces 5c (a top surface $5c_1$ and a bottom surface $5c_2$) and side surfaces 5d ($5d_1$ and $5d_2$) all of which serve as reflecting surfaces for totally reflecting the light beams which have entered from the entrance surface 5a, and an exit surface 5b through which the light beams guided directly from the entrance surface 5a and the light beams totally reflected once or a plurality of times by the top and bottom surfaces 5c and the side surfaces 5d are allowed to exit toward the object side.

The portion between the entrance surface 5a and the exit surface 5b will be hereinafter referred to as the light guide portion. The entrance surface 5a and the exit surface 5b are opposed to each other along the Z axis which extends in the direction of an object, that is, the entrance surface 5a and the exit surface 5b are both disposed on a line along which the optical axis of the photographing lens extends. Each of the entrance surface 5a and the exit surface 5b is formed of a plane surface or a curved surface having a curvature for a positive or negative refractive power (the term "curved surface" used herein signifies a spherical surface, an aspherical surface, an ellipsoidal surface, a quadratic surface, a cylindrical surface, a toric surface and the like). A part of the entrance surface 5a and/or the exit surface 5b may be formed as a curved surface, and the other part as a plane surface.

Although the exit surface 5b of the first embodiment is a curved surface as shown in FIG. 1, the entrance surface 5a and the exit surface 5b of the optical member 5 are shown as plane surfaces in FIGS. 2 through 7 for the sake of simplicity. Each of the top and bottom surfaces $5c_1$ and $5c_2$ and the side surfaces $5d_1$ and $5d_2$ is a plane or curved surface which makes a large angle with the entrance surface 5a and extends toward the object side (toward the front).

The shape of the optical member 5 is such that the exit area of the exit surface 5b is large compared to the entrance area of the entrance surface 5a. For example, the XY cross-sectional shape of the optical member 5 is such that the distance between the side surfaces $5d_1$ and $5d_2$ and/or the distance between the top and bottom surfaces $5c_1$ and $5c_2$ increases at a random rate or sequentially at a constant rate from the entrance surface 5a toward the exit surface 5b.

Specifically, the light guide portion of the optical member 5 has an XY cross-sectional area which increases at a constant rate or in the form of a higher-order function.

Incidentally, in the first embodiment, the illuminating device 3 may be provided in a side portion of the camera body 1 for sliding movement in the vertical direction (the Y direction) or in the horizontal direction (the X direction).

In the illuminating device 3 of the first embodiment, some of the light beams emitted from the flash discharge tube 4 are directly guided to the entrance surface 5a of the optical member 5, while the other light beams are guided to the entrance surface 5a after having been reflected by the reflecting mirror 6. Some of the light beams which have been incident on the entrance surface 5a travel rectilinearly and are guided to the exit surface 5b, while the other light beams are totally reflected by the top and bottom surfaces 5c and/or the side surfaces 5d and are guided to the exit surface 5b.

In this manner, after total reflection has been repeated at the internal surfaces of the optical member 5, an illuminating light beam of high intensity having a predetermined shape (for example, a square in XY cross section and a rectangle which is longer in the direction of the X axis) is projected onto the object from the exit surface 5b.

In particular, the diametrical (Y-direction) light beams of the light beams from the flash discharge tube 4 are repeatedly totally reflected at the top and bottom surfaces $5c_1$ and $5c_2$, while the axial (X-direction) light beams are efficiently gathered by the refraction of the curved surface of the exit surface 5b and projected onto the object.

The entrance surface 5a of the optical member 5 has a rectangular shape as viewed in the direction of the Z axis, and the length in the X-axis direction of the entrance surface 5a is slightly longer than the effective arc length in the X-axis direction of the flash discharge tube 4, while the length in the Y-axis direction of the entrance surface 5a is approximately the same as the width of the opening of the reflecting mirror 6 to such an extent that no gap occurs between the entrance surface 5a and the opening of the reflecting mirror 6. Thus, the light beams emitted from the flash discharge tube 4 are efficiently taken in from the entrance surface 5a. The exit surface 5b is a rectangular opening similar to the entrance surface 5a, as viewed in the direction of the Z axis.

Figure 2:
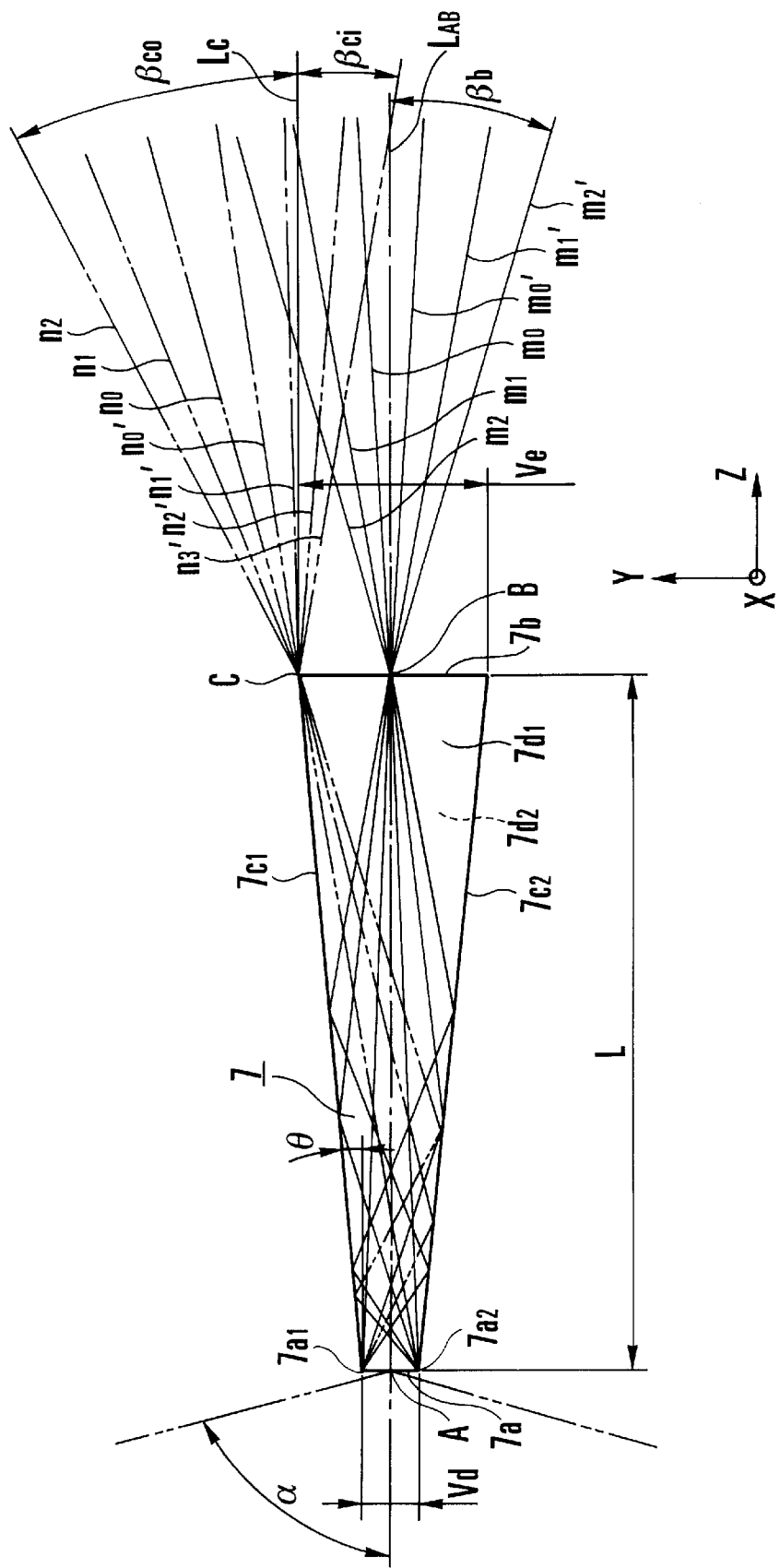
FIG. 2 is an explanatory view of one example of an optical member for use in the illuminating device shown in FIG. 1.

Various examples of the optical member 5 for guiding an illuminating light beam in the first embodiment will be described below. FIG. 2 is a diagrammatic cross-sectional view showing the essential portion of an optical member 7 made from a plate-shaped light guide, as one example of the optical member for guiding an illuminating light beam in the first embodiment. The optical member 7 includes an entrance surface 7a having a polygonal shape (for example, a square shape) composed of a plane surface or a curved surface, an exit surface 7b having a polygonal shape (for example, a square shape) composed of a plane surface or curved surface having a larger area than the entrance surface 7a, and top and bottom surfaces $7c_1$ and $7c_2$ and side surfaces $7d_1$ and $7d_2$ each of which is composed of a plane surface or a curved surface which connects the entrance surface 7a and the exit surface 7b with a predetermined inclination. The optical member 7 has a plate-like shape such as a polygonal prismoid (for example, a quadrangular prismoid) as a whole. In FIG. 2, the entrance surface 7a and the exit surface 7b are shown as plane surfaces for the sake of simplicity. A flash discharge tube (not shown) is disposed at a predetermined distance from the entrance surface 7a. In FIG. 2, symbol $V_d$ denotes the height of the entrance surface 7a (the size of the entrance surface 7a measured in the Y direction, i.e., in the vertical direction with the optical member 7 being fitted in a camera body), symbol A denotes the central portion (center) of the entrance surface 7a as viewed in the height (Y) direction thereof, symbol $V_e$ denotes the height of the exit surface 7b, symbol B denotes the central portion (center) of the exit surface 7b, and symbol L denotes the length of the optical member 7 (the size of the optical member 7 measured in the Z-axis direction). A line $L_{AB}$ is a straight line which connects the point A and the point B. (The line $L_{AB}$ is hereinafter referred to as the optical axis or the illuminating optical axis.) A line $L_C$ is an axis which passes through an end C of the exit surface 7b and is parallel to the optical axis $L_{AB}$.

In the first embodiment, letting L be the length of the optical member 7, the height $V_d$ of the entrance surface 7a and the height $V_e$ of the exit surface 7b are set as follows:

$0.03 < V_d/L < 0.3$, $0.08 < V_e/L < 0.8$, so that an illumination area is appropriately set for the vertical direction of the object.

In addition, a width $H_d$ of the entrance surface 7a (the size of the entrance surface 7a measured in the X direction, i.e., in the horizontal direction with the optical member 7 being fitted in the camera body) and a width $H_c$ of the exit surface 7b are set as follows:

$$0.02 < H_d/L < 2.0,$$

$$0.03 < H_c/L < 3.0,$$

so that the illumination area is appropriately set for the horizontal (X) direction of the object.

The following description refers to the state of travel of light beams which enter the optical member 7 through the entrance surface 7a at a maximum incident angle α with a uniform diffusion light source which is uniform for all angular components (rays) being disposed in front of the entrance surface 7a, i.e., with the intensities of all angular components (light distribution) being uniform at all points of the height $V_d$ of the entrance surface 7a.

In this case, from among the components of a light beam which has entered the optical member 7 through points $7a_1$ and $7a_2$ of the entrance surface 7a, components having small incident angles travel rectilinearly in the optical member 7 and exit from the exit surface 7b, as shown in FIG. 2. On the other hand, components having large incident angles are totally reflected at the surfaces $7c_1$ and $7c_2$ of the optical member 7 a predetermined number of times according to their respective incident angles, and exit from the exit surface 7b. In the shown example, particular components are totally reflected a maximum of three times before they exit from the exit surface 7b. This manner will be described below with reference to the ray-tracing diagram shown in FIG. 2.

In the ray-tracing diagram, solid lines $m_2$ to $m_2'$ represent components which pass through the central portion B of the exit surface 7b at their respective maximum angles after having been totally reflected by their predetermined numbers of times. The suffixes of symbols $m_2$ to $m_2'$ represent the number of total reflections of the respective rays, and each suffix with an apostrophe represents a ray which exits from the exit surface 7b in an upward direction, whereas each suffix with no apostrophe represents a ray which exits from the exit surface 7b in a downward direction. For example, symbol $m_2$ means an upper-side maximum angular component which passes through the point B after having been totally reflected twice, and symbol $m_0'$ means a lower-side maximum angular component of light which directly exits from the exit surface 7b without being totally reflected.

In this case, the maximum exit angle (a half angle of view) at the central portion B is an angle $\beta_b$, and it is seen that a light beam passing through the point $7a_1$ at the top end of the entrance surface 7a is totally reflected twice and exits from the central portion B of the exit surface 7b.

In the ray-tracing diagram, two-dot chain lines $n_3'$ to $n_2$ represent rays which pass through an end C of the exit surface 7b at their respective maximum angles after having been totally reflected by their predetermined numbers of times. In this case, a ray which has been totally reflected by a maximum of twice is present on the upper side, whereas a ray which has been totally reflected by a maximum of three times is present on the lower side.

The maximum exit angle at the end C is an angle $\beta_{Co}$ on a side most distant from the optical axis, or an angle $\beta_{Ci}$ on a side closest to the optical axis. The angle $\beta_{Co}$ and the angle $\beta_{Ci}$ correspond to the respective maximum numbers of total reflections, and the angle $\beta_{Co}$ is the maximum exit angle of a component which exits from the exit surface 7b.

The above numerical values have the following relation:

$$\beta_{Co} > \beta_b > \beta_{Ci}.$$

In the above example, although reference has been made to only two points, i.e., the central portion B and the end C of the exit surface 7b, rays which pass through intermediate points therebetween exhibit intermediate characteristics. As compared with the end C, at each of the intermediate points, the maximum value $\beta_{Co}$ of the exit angle toward the outside (from the axis LC toward the outside of the optical member 7) tends to become small, whereas the maximum angle $\beta_{Ci}$ toward the optical axis $L_{AB}$ tends to become large. If the maximum values of the entrance and exit angles of a light beam with the optical member 7 are compared with each other, it can be seen that the maximum value $\beta_{Co}$ of the exit angle of the light beam is extremely small with respect to the maximum value α of the incident angle of the light beam.

As is apparent from the above description, if light having uniform light distribution is made incident on the entrance surface 7a, the light is made narrow via the optical member 7 and exits from the exit surface 7b as a light beam. The light distribution of the light beam is approximately symmetrical about the optical axis $L_{AB}$ at the central portion B, but toward a marginal portion, the center of the light distribution gradually shifts toward the outside, and reaches the outermost side at the end C. Thus, the maximum value $\beta_{Co}$ at the end C becomes the maximum exit angle of the light beam passing through the optical member 7.

If a light beam having nonuniform light intensity distribution is made incident on the entrance surface 7a, the nonuniformity of light intensity distribution is gradually reduced while the light beam is being repeatedly totally reflected at the top and bottom surfaces $7c_1$ and $7c_2$ and/or at the side surfaces $7d_1$ and $7d_2$, so that a light beam of less nonuniform light intensity distribution exits from the exit surface 7b. This is because, as the incident light is repeatedly totally reflected at such total reflection surfaces inclined at predetermined angles (the top and bottom surfaces $7c_1$ and $7c_2$ and/or the side surfaces $7d_1$ and $7d_2$), the angular components of the incident light are combined by being shifted by the inclination angles without being retained.

Accordingly, in the first embodiment, by appropriately setting the inclination angles and the lengths of the optical member in the above-described manner, the incident light is converted into light having less nonuniform light intensity distribution and approximately uniform light distribution before the light exits from the optical member.

A specific numerical example of the optical member 7 shown in FIG. 2 in the first embodiment are shown below:

$V_d = 2.1$     $L = 25.0$     $\alpha = 75°$ $V_e = 7.0$     $n = 1.49171$ (the refractive index of the optical material of the optical member) (acrylic resin)

$\beta_{Co} = 27.6°$     $\beta_{Ci} = -10.3°$     $\beta_b = 16.4°$.

In this numerical example, light which is incident at the maximum incident angle α of 75° is converted into a narrow light beam which exits within the maximum exit angle $\beta_{Co}$ of 27.6°.

Although the above description has referred to only the vertical direction of the optical member, a similar description is applicable to the horizontal direction of the optical member.

Figure 3:
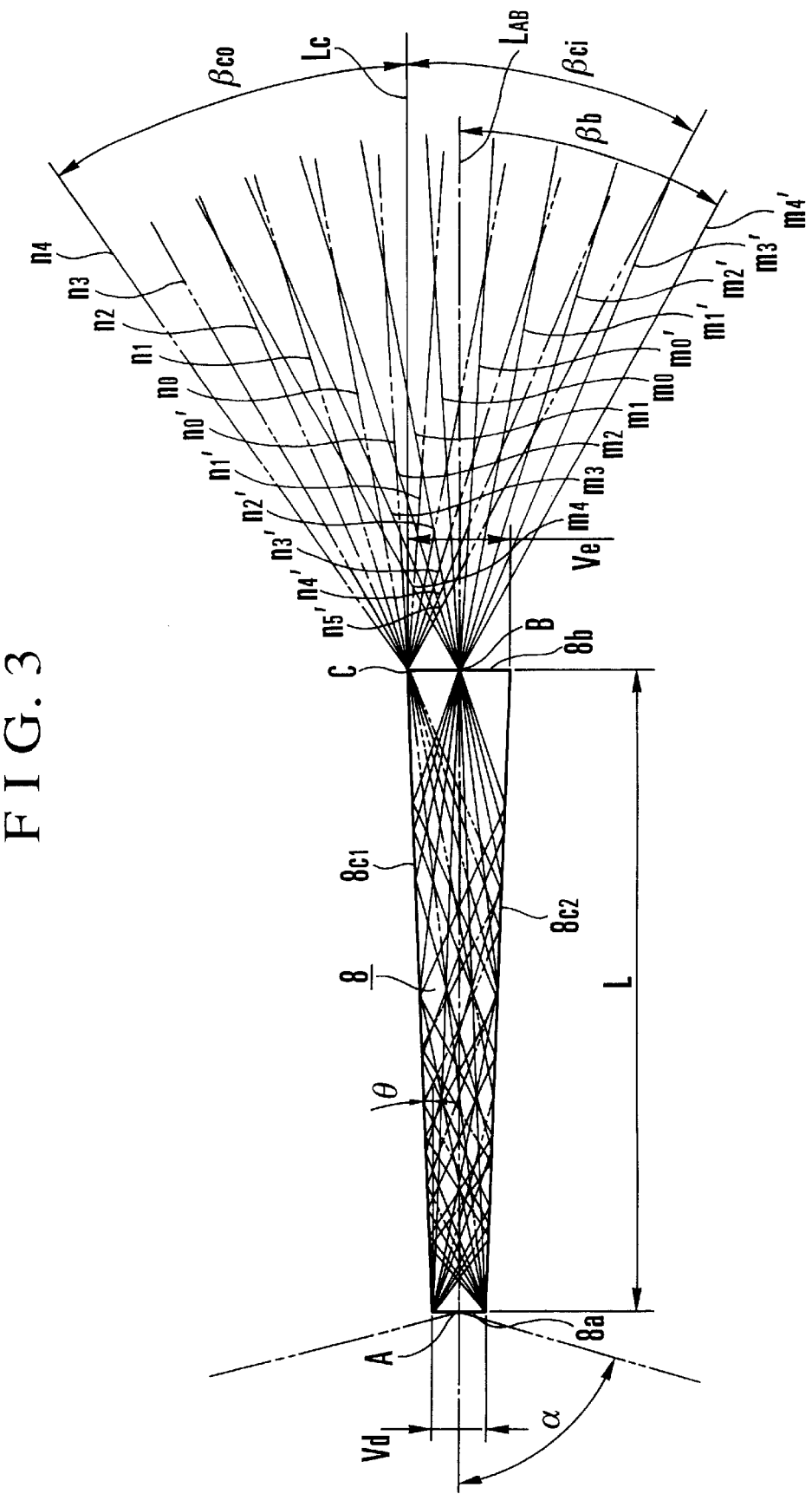
FIG. 3 is an explanatory view of another example of the optical member for use in the illuminating device shown in FIG. 1.
Figure 4:
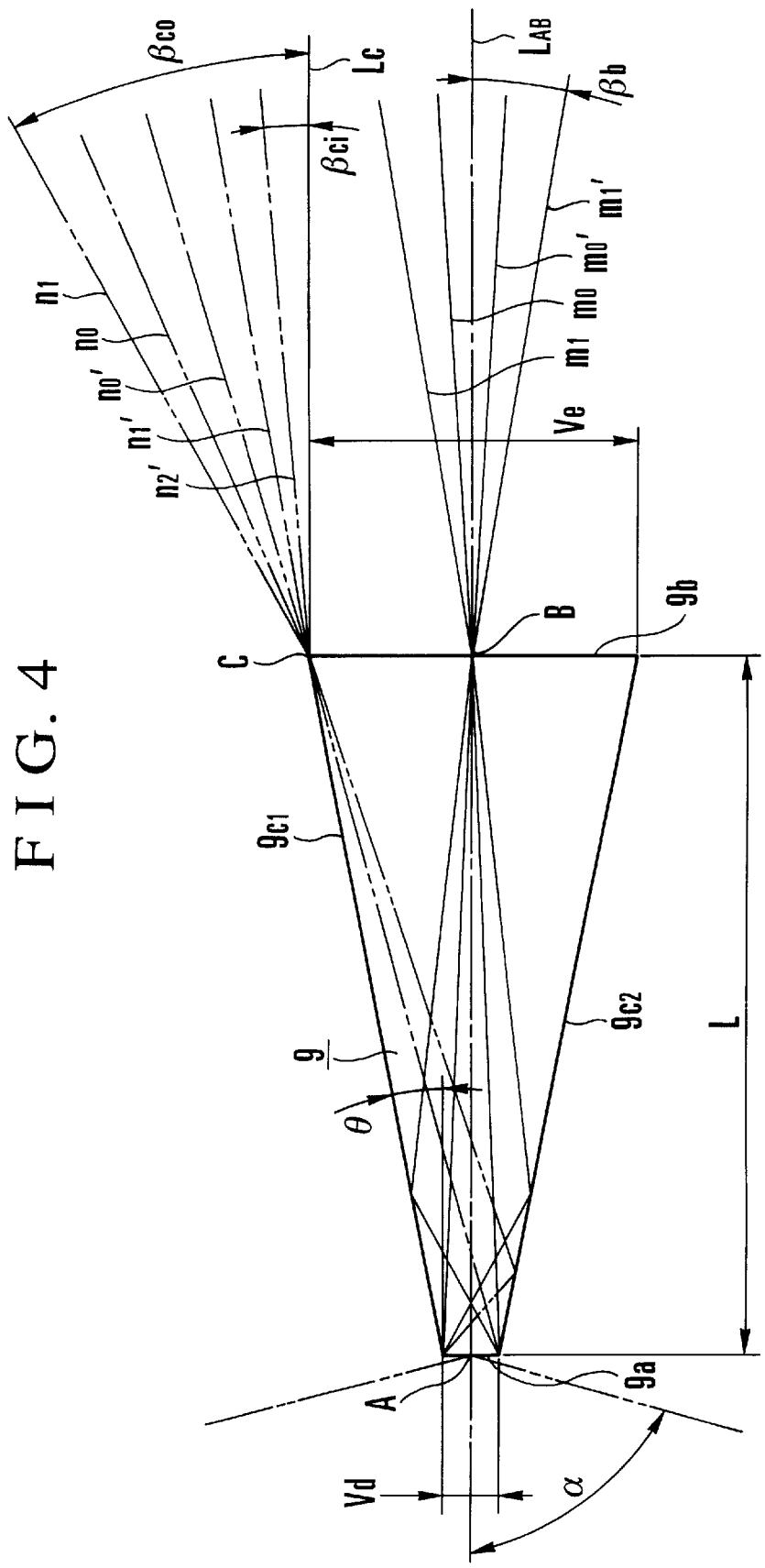
FIG. 4 is an explanatory view of still another example of the optical member for use in the illuminating device shown in FIG. 1.
Figure 7:
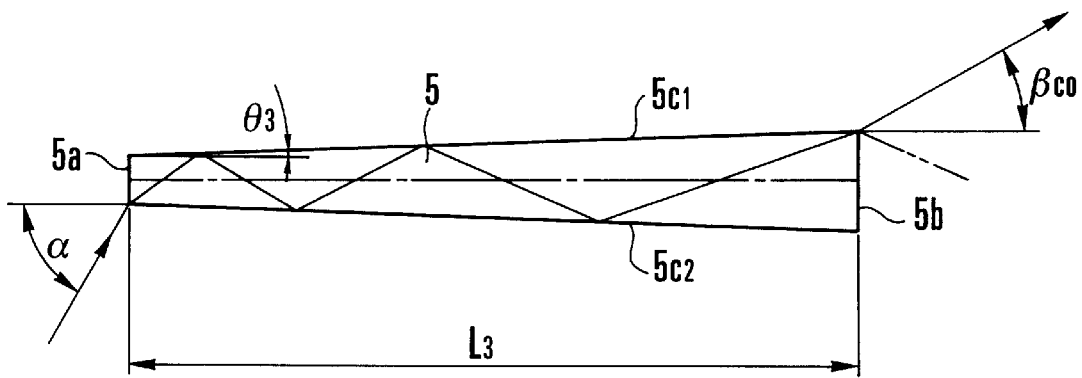
FIG. 7 is an explanatory view of an optical member for use in the illuminating device shown in FIG. 1.

Each of FIGS. 3 and 4 is an optical-path diagram showing a different optical member which has an entrance surface of the same height $V_d$ as the optical member 7 shown in FIG. 7 and an exit surface of the height $V_d$ different from that of the optical member 7.

FIG. 3 shows an optical member 8 in which the height $V_e$ of an exit surface 8b is small compared to the optical member 7 shown in FIG. 2, while FIG. 4 shows an optical member 9 in which the height $V_e$ of an exit surface 9b is large compared to the optical member 7 shown in FIG. 2. The optical member 8 shown in FIG. 3 includes an entrance surface 8a, the exit surface 8b, and top and bottom surfaces $8_{c1}$ and $8_{c2}$, and the optical member 9 shown in FIG. 4 includes an entrance surface 9a, the exit surface 9b, and top and bottom surfaces $9_{c1}$ and $9_{c2}$.

In addition, each of FIGS. 3 and 4 shows the traces of rays which exit from each of the central portion B and the end C of the exit surface 8b (9b) at their maximum exit angles corresponding to their respective numbers of total reflections. The meaning of the suffix of each symbol is similar to that described previously in connection with FIG. 2.

The optical members 8 and 9 shown in FIGS. 3 and 4 will now be compared with the optical member 7 shown in FIG. 2. In the optical member 8 of FIG. 3 which has the exit surface 8b of the height $V_e$ small compared to the optical member 7, rays which are totally reflected a maximum of four times are present at the central portion B, while rays which are totally reflected a maximum of five times are present at the end C, so that the rays which reach each of the two points of the exit surface 8b contain components which are repeatedly totally reflected a larger number of times than in the optical member 7. The maximum exit angles $\beta_b$, $\beta_{C0}$ and $\beta_{Ci}$ at each of the two points are larger than those of the optical member 7, and the difference between each of the maximum exit angles $\beta_b$, $\beta_{C0}$ and $\beta_{Ci}$ is smaller than that in the optical member 7. In other words, the rays which exit from each of the points of the exit surface 8b are approximately constantly distributed over a comparatively wide area irrespective of the locations of the respective points, that is, light-gathering performance for uniformly gathering light is lower than that of the optical member 7.

A numerical example of the optical member 8 shown in FIG. 3 is shown below for the purpose of comparison with the numerical example of the optical member 7 shown in FIG. 2:

$V_d = 2.1 \quad L = 25.0 \quad \alpha = 75°$ $V_e = 4 \quad n = 1.49171$ (the refractive index of the optical material of the optical member) (acrylic resin)

$\beta_{C0} = 35.6° \quad \beta_{Ci} = -28.4° \quad \beta_b = 29.4°$.

Then, the optical member 9 shown in FIG. 4, in which the height $V_e$ of the exit surface 9b is large compared to the optical member 7 shown in FIG. 2, will be compared with the optical member 7. In the optical member 9 shown in FIG. 4, rays which are totally reflected up to a maximum of once are present at the central portion B of the exit surface 9b, while rays which are totally reflected up to a maximum of twice are present at the end C of the exit surface 9b. Accordingly, the maximum exit angles $\beta_b$, $\beta_{C0}$ and $\beta_{Ci}$ at each of the two points are smaller than those in the optical member 7, and the angular extent of each of the maximum exit angles $\beta_b$, $\beta_{C0}$ and $\beta_{Ci}$ is narrower than that in the optical member 7.

The difference between each of the maximum exit angles $\beta_b$, $\beta_{C0}$ and $\beta_{Ci}$ is larger than that in the optical member 7, and as the center of the direction in which a ray exits from the exit surface 9b at each of the exit points becomes more distant from the optical axis $L_{AB}$, the inclination of the center of the exiting direction of the ray becomes larger. In other words, since the exit surface 9b is wider than the exit surface 7b, light distribution characteristics which are obtained by combining the rays which exit from each of the exit points of the exit surface 9b are such that although an area closer to the optical axis $L_{AB}$ tends to become brighter than areas closer to marginal portions, a central area can be made extremely bright. That is to say, it is possible to obtain light distribution having less uniformity but high directionality.

A numerical example of the optical member 9 shown in FIG. 4 is shown below for the purpose of comparison with the numerical example of the optical member 7 shown in FIG. 2:

$V_d = 2.1 \quad L = 25.0 \quad \alpha = 75°$ $V_e = 12 \quad n = 1.49171$ $\beta_{C0} = 29.4° \quad \beta_{Ci} = 4.8° \quad \beta_b = 9.9°$.

Although the above description has referred to optical members each of which has the same length L, an exit surface of a different height $V_e$ and an entrance surface of the same height $V_d$, the first embodiment is also applicable to optical members each of which has a different length L, an exit surface of the same height $V_e$ and an entrance surface of the same height $V_d$. If the length L has a certain degree of freedom, the following tendency appears.

If the length L is large, light distribution which has uniform light intensity distribution at the exit surface and high directionality is obtained and the maximum value of the exit angle tends to approach an angle θ in each of FIGS. 2, 3 and 4. The light distribution is uniform because it is not easily affected by nonuniform light distribution such as the nonuniform light distribution of a light source, at the time of incidence of light on the entrance surface of the optical member. This is because the number of total reflections increases and the light distribution characteristics of the light source at the time of incidence are mitigated.

On the other hand, if the length L is small, the light intensity distribution of the exit surface shows a hill-shaped light distribution characteristic in which the intensity of exiting light is high about the optical axis and becomes gradually lower toward marginal portions, and the area of illumination tends to be wider than the angle θ in each of FIGS. 2, 3 and 4. In this case, the light distribution is easily affected by nonuniform light distribution such as the nonuniform light distribution of a light source at the time of incidence of light on the entrance surface of the optical member. This is because the number of total reflections is small and the characteristics of the light source at the time of incidence are directly reflected to the characteristics of exiting light.

Although in each of the above-described examples of the optical member the top and bottom surfaces $7_{c1}$, $7c_2$; $8_{c1}$, $8_{c2}$; and $9_{c1}$, $9_{c2}$, of the light guide portions of the respective optical members 7, 8 and 9 are shown as plane surfaces for the sake of simplicity of description, such top and bottom surfaces are not necessarily limited to plane surfaces, and arbitrary shapes such as curved surfaces may also be used.

In a case where the top and bottom surfaces are curved surfaces, rays which advance from the entrance surface directly to the exit surface without striking the top or bottom surface are not affected and show light distribution characteristics similar to those of each of the above-described examples of the optical member, but components having large incident angles are affected by the shape of each reflecting surface and show the following characteristics.

If light beams strike either of the curved surfaces, the distribution characteristics of the light beams vary according to the shape of the curved surface. As compared with an optical member whose top and bottom surfaces are plane surfaces, in an optical member using outward curved surfaces (convex surfaces), although the number of total reflections decreases, directionality increases because the amount of angle correction per total reflection increases. In other words, the use of such curved surfaces is effective in intensifying the distribution of light in only a particular direction after the light exits from the optical member, and for example, if light beams after reflection are directed toward the optical axis $L_{AB}$, light distribution whose central portion is extremely bright is obtained. However, the whole of the light distribution easily becomes nonuniform and is easily affected by nonuniform light distribution at the time of incidence of the light beams (such as the nonuniform light distribution of a light source).

On the other hand, as compared with an optical member whose top and bottom surfaces are plane surfaces, in an optical member using inward curved surfaces (concave surfaces), although the number of total reflections increases, the amount of angle correction per total reflection decreases. Since the number of light beams decreases which advance from the entrance surface directly to the exit surface, the light distribution of exiting light beams is not easily affected by nonuniform light distribution at the time of incidence, so that it is possible to achieve uniform light distribution characteristics by using a short arrangement compared to the optical member formed of plane surfaces.

The numerical relations of preferred shapes of the optical member in the first embodiment will be described below with reference to FIGS. 5 to 7.

Referring first to an ideal state, illumination at the maximum exit angle $\beta_{C0}$ can be most effectively obtained by using an optical member, if the inclination angle $\theta$ of each of the top and bottom surfaces $5c_1$ and $5c_2$ is determined as:

$$\theta = \sin^{-1}((\sin \beta_{C0})/n),$$

(n: refractive index of the material of the optical member) and if the length L of the optical member is infinitely extended. However, actually, this shape is impractically large.

In practical terms, the inclination angle $\theta$ of each of the top and bottom surfaces $5c_1$ and $5c_2$ of the optical member is made smaller than the above value to make narrow the entire exit angle and the length L of the optical member is reduced to a practical length, and the maximum value of leak light which cannot be completely controlled under such conditions is made coincident with $\beta_{C0}$.

Figure 5:
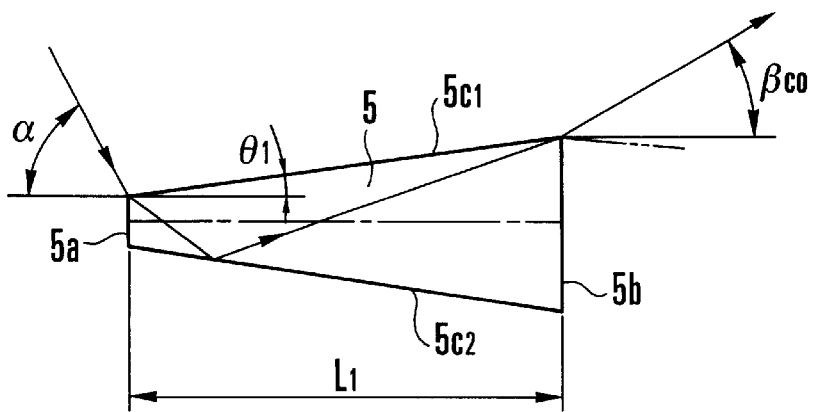
FIG. 5 is an explanatory view of an optical member for use in the illuminating device shown in FIG. 1.
Figure 6:
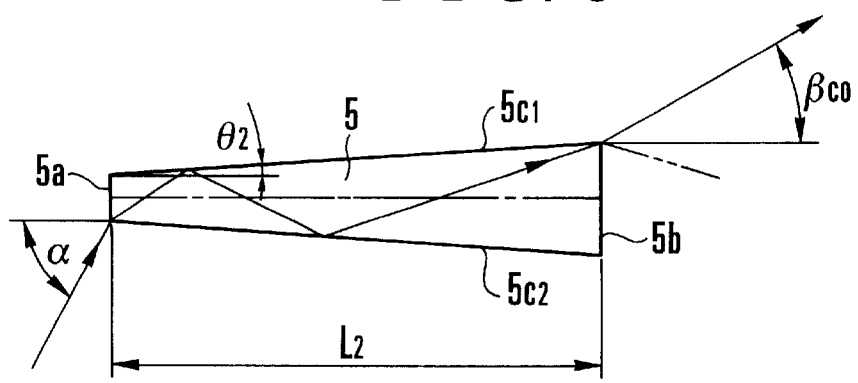
FIG. 6 is an explanatory view of an optical member for use in the illuminating device shown in FIG. 1.

FIGS. 5 to 7 show different shapes of the optical member in the first embodiment which are calculated on the basis of the above theory.

Each of FIGS. 5 to 7 shows an arrangement for obtaining the maximum value $\beta_{C0}$ of the exit angle with respect to the maximum value $\alpha$ of the incident angle. In the arrangement shown in FIG. 5, a maximum of one total reflection is allowed, and an inclination angle $\theta_1$ and a length $L_1$ are minimized. In the arrangement shown in FIG. 6, a maximum of two total reflections are allowed, and an inclination angle $\theta_2$ and a length $L_2$ are minimized. In the arrangement shown in FIG. 7, a maximum of four total reflections are allowed, and an inclination angle $\theta_3$ and a length $L_3$ are minimized.

The relation between a maximum number of total reflections N and the inclination angle $\theta$ which realize such a minimum shape is:

$$N \cdot \theta = \{\sin^{-1}((\sin \alpha)n) - \sin^{-1}((\sin \beta_{C0})n)\}/2$$

and the shortest length L of the optical member at this time is obtained from:

$$L = \frac{d \cdot \cos\theta}{2} \cdot \frac{\cot\{\sin^{-1}((\sin\alpha)/n)\} + \cos\theta}{\cot(2N+1) \cdot \theta - \cot\{\sin^{-1}((\sin\alpha)/n)\}} \times \sqrt{1 + \cot^2(2N+1) \cdot \theta} - (d/2) \cdot \cot\theta.$$

From the above relation, the necessary conditions for the shape of an optical member which can effectively control light distribution by using total reflection are that the inclination angle $\theta$ of the optical member is smaller than the value $\theta_1$ which corresponds to the minimum number of total reflections, i.e., one total reflection, and that the length L of the optical member is larger than the length $L_1$ which corresponds to the minimum number of total reflections.

This relation is given by the following expressions:

$$\theta \leq \{\sin^{-1}((\sin\alpha)/n) - \sin^{-1}((\sin\beta_{C0})/n)\}/2$$

$$L \geq \frac{d \cdot \cos\theta}{2} \cdot \frac{\cos\{\sin^{-1}((\sin\alpha)/n)\} + \cot\theta}{\cot 3\theta - \cot\{\sin^{-1}((\sin\alpha)/n)\}} \times \sqrt{1 + \cot^2 3\theta} - (d/2) \cdot \cot\theta.$$

Numerical examples of the shapes shown in FIGS. 5 to 7 will be described below.

Letting $V_d$ be the height of the entrance surface of an optical member, letting $V_e$ be the height of the exit surface of the optical member, letting L be the length of the optical member, letting $\theta$ be an inclination angle of each of the top and bottom surfaces of the optical member, letting $\alpha$ be a maximum incident angle effective at the time of incidence, letting $\beta_{C0}$ be a maximum exit angle at the exit surface, and letting n be the refractive index of the material of the optical member, $V_d = 2.1$  $n = 1.49171$ (acrylic resin)  $\alpha = 60°$ $\beta_{C0} = 3.0°$  ($V_d, n, \alpha$ and $\beta_{C0}$ are common to all the numerical examples)

Figure 8:
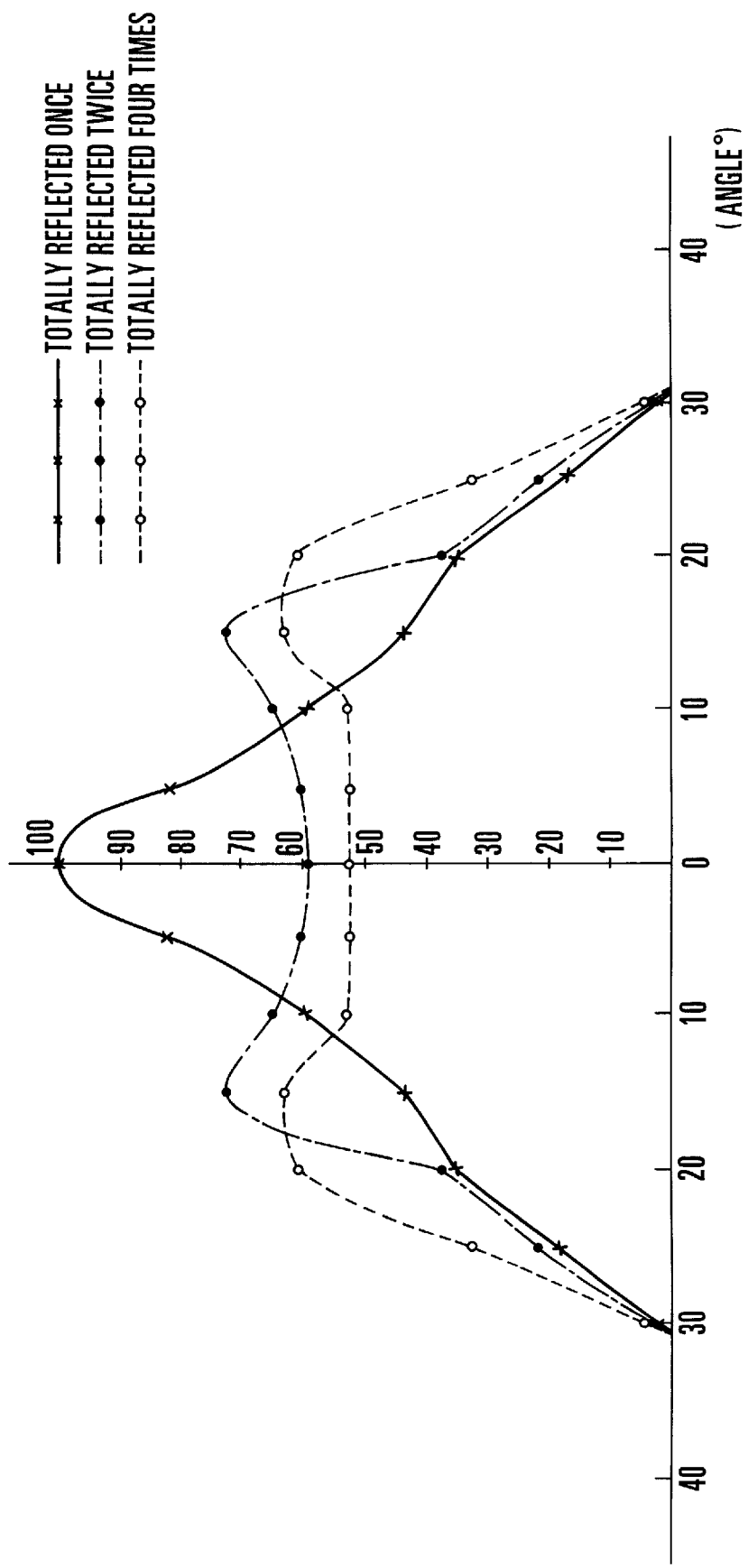
FIG. 8 is an explanatory view of light distribution characteristics of the optical member for use in the illuminating device shown in FIG. 1.

$\theta_1 = 7.953°$  $L_1 = 18.1$  $V_{e1} = 7.2,$
$\theta_2 = 3.977°$  $L_2 = 20.6$  $V_{e2} = 5.0,$
$\theta_3 = 1.988°$  $L_3 = 30.6$  $V_{e3} = 4.2.$ The thus-obtained light distribution characteristics are shown in FIG. 8. As shown, the shape for the smallest number of total reflections exhibits a characteristic curve which reaches a highest peak in its central portion and becomes lower toward the maximum exit angle $\beta_{C0}$. However, as the number of total reflections increases, the peak tends to shift from the central portion toward marginal portions.

By using these characteristics, it is possible to select an illuminating optical system suited to the required illumination area. For example, a shape in which the number of total reflections is large is suitable for use in uniformly illuminating a plane which lies at a predetermined distance, because such shape can realize high illumination at marginal areas. A shape in which the number of total reflections is small is suitable for use in illuminating a central portion of the plane with an intense spot-like beam.

The above description of the first embodiment has stated that it is possible to obtain the various characteristics required for the illuminating optical system by gradually widening the XY cross-sectional area of the optical member. However, the first embodiment is not limited to only the above-described shapes, and various modifications such as the following ones are also available.

(b1) An optical member which includes top and bottom surfaces and/or side surfaces each having not a constant inclination but a plurality of different inclinations.

(b2) An optical member which includes top and bottom surfaces and/or side surfaces each having a portion which defines a constant cross-sectional area or a portion which defines a decreased cross-sectional area.

(b3) An optical member the optical axis $L_{AB}$ of which is not straight but curved with a constant curvature. Specifically, its top and bottom surface or its side surfaces are bent in the same direction with the cross-sectional area of the optical member being increased at a constant rate.

Any of the above modifications not only makes it possible to achieve an effective layout of the space within the camera body, but also has the effect of realizing uniform light distribution and reducing nonuniform light distribution of light beams which are incident on the entrance surface of the optical member.

As described above, the first embodiment makes it possible to efficiently illuminate an object while making effective use of light beams emitted from a light source, by appropriately setting predetermined factors such as the height and the width of the entrance surface of the optical member, the length L of the optical member, the height and the width of the exit surface, the shapes of the top and bottom surfaces, the shapes of the side surfaces and the surface shapes of the entrance surface and the exit surface.

Both the optical member 5 and the flash discharge tube 4 which serves as light source means in the first embodiment will be described below. The smaller the area of the entrance surface 5a, the smaller the entire optical member 5 can be made.

Substantially the smallest area of the entrance surface 5a which does not shade light beams is an area which corresponds to the shape of the effective arc portion of the flash discharge tube 4. In this case, the amount of central light can be increased, but the amount of marginal light greatly decreases and uniform light distribution cannot be obtained. In addition, because of the construction of the reflector 6, if the area of the entrance surface 5a is smaller than the outer diameter of the flash discharge tube 4, a gap occurs between the reflector 6 and the entrance surface 5a of the optical member 5 and rays leak through the gap, so that the efficiency of illumination becomes low.

If the reflector 6 is formed to gradually decrease in opening size in its forward direction so as to prevent occurrence of the gap, the number of reflections within the reflecting mirror 6 increases and the efficiency of illumination becomes low. On the other hand, if the entrance surface 5a is made excessively wide, the exit surface 5b needs to be made large in proportion to an increase in the area of the entrance surface 5a, so that the entire optical member 5 becomes large in size.

For the above reasons, if the entrance surface 5a of the optical member 5 has a rectangular shape, the length in the Y direction of the rectangular shape is preferably determined as:

$$H1 \leq DY \leq 2 \times H2,$$

where DY represents the length in the Y direction of the rectangular shape and H1 and H2 respectively represent the inner diameter and the outer diameter of the flash discharge tube 4.

The length in the axial (X) direction of the optical member 5 is determined in the following manner so that exiting light beams can be effectively used. The minimum length of the optical member 5 is preferably made the same as the arc length of the flash discharge tube 4, and the maximum length of the optical member 5 is preferably determined in the following manner so as to take account of the width of a holding portion of the flash discharge tube 4 and an increase in the entire size of the optical member 5 due to an increase in the length of the same:

$$HL \leq DX \leq HL+8 \text{ (mm)},$$

where DX represents the length in the X direction of the entrance surface 5a of the optical member 5, HL represents the arc length of the flash discharge tube 4, and mm represents the unit of dimension.

The construction of each of the side surfaces $5d_1$ and $5d_2$ of the optical member 5 will be described below. It is preferable to form the side surfaces $5d_1$ and $5d_2$ so that all light beams can be guided to the exit surface 5b without being made incident on either of the side surfaces $5d_1$ and $5d_2$.

Figure 9:
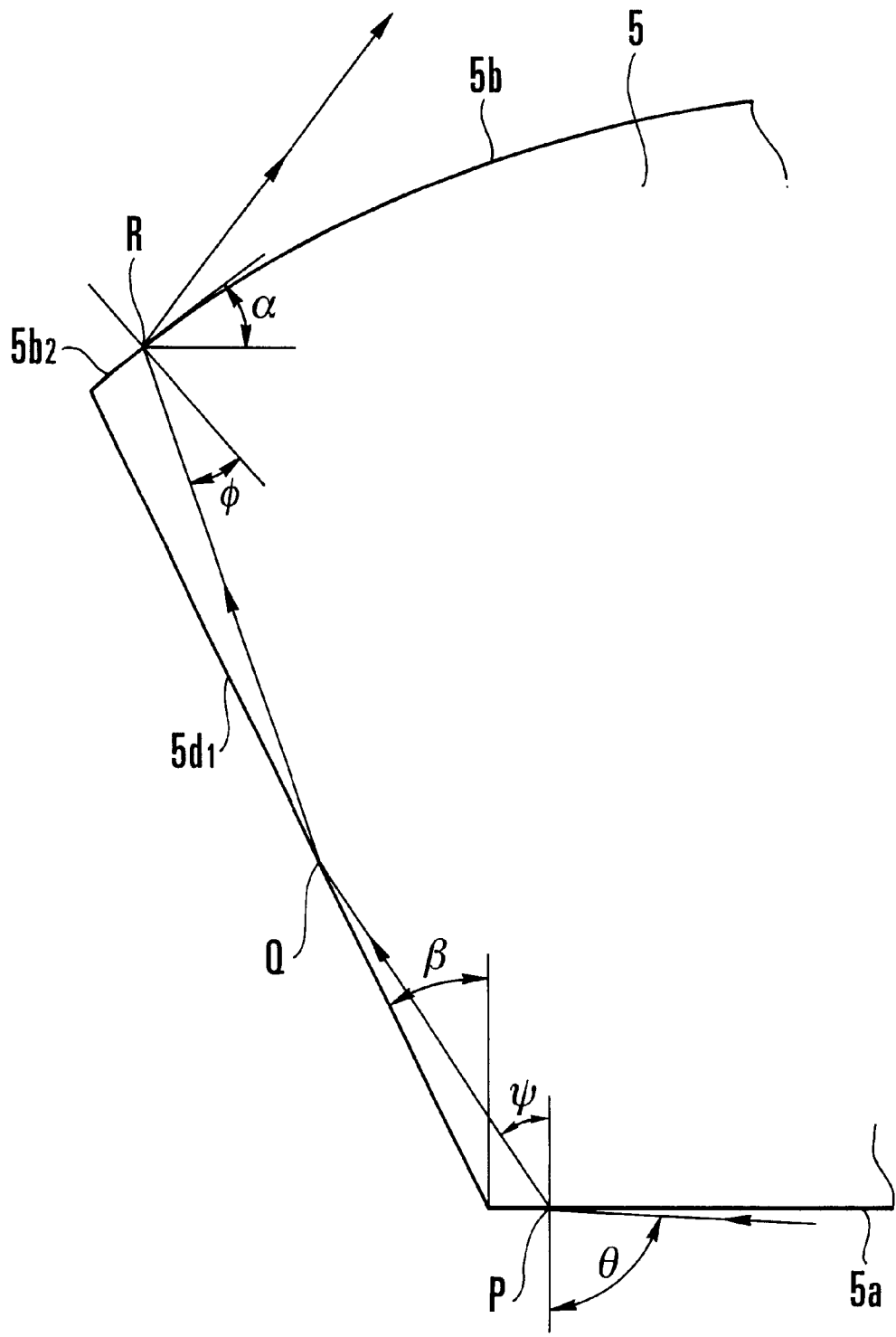
FIG. 9 is an explanatory view of an optical path of a portion of the optical member for use in the illuminating device shown in FIG. 1.

Specifically, as shown in FIG. 9, an inclination β of each of the side surfaces $5d_1$ and $5d_2$ is preferably determined as:

$$\beta \geq \sin^{-1}(1/n),$$

where n represents the refractive index of the material of the optical member 5.

However, in some actual cases, the inclination β of each of the side surfaces $5d_1$ and $5d_2$ must be made small for various reasons: for example, it may be impossible to obtain a sufficient opening area in the horizontal (X) direction or a sufficient length to gather light in the vertical direction in a marginal portion of the optical member 5. An actually allowable value of the angle β is up to approximately ⅓ of the above angle β in practical terms. Specifically, the actually allowable angle β is preferably determined as:

$$\{\sin^{-1}(1/n)\}/3 \leq \beta.$$

Incidentally, if each of the side surfaces $5d_1$ and $5d_2$ is a curved surface, the angle β is the inclination of a tangent to the curved surface. If the angle β is set to an angle less than the inclination of the tangent, light beams, after having been reflected by the side surfaces $5d_1$ and $5d_2$, are easily totally reflected by the exit surface 5b, so that loss of the amount of light increases. If the angle of the exit surface 5b is made small so that the loss of the amount of light does not occur, the required refractive power is not obtained and high light-gathering performance for a small space cannot be obtained.

The exit surface 5b of the optical member 5 will be described below. It is desirable that the exit surface 5b have a shape such that all light beams that are incident at a maximum angle $\theta_{max}$ can exit from the exit surface 5b after having been reflected by the side surfaces $5d_1$ and $5d_2$.

Each numerical relation will be described below with reference to FIG. 9. The above conditions are shown as follows:

the relation of the entrance surface 5a:

$$\psi = \sin^{-1}(\sin\theta_{max}/n),$$

the total reflection condition of the exit surface 5b:

$$\phi < \sin^{-1}(1/n).$$

Since $$\phi = \alpha - (2\beta - \psi),$$

$$\alpha - (2\beta - \psi) < \sin^{-1}(1/n).$$

Therefore, $$\alpha \leq 2\beta - \sin^{-1}((\sin \theta_{max})/n) + \sin^{-1}(1/n). \quad (1)$$

The above expression is the condition under which the light beams incident at the maximum incident angle $\theta_{max}$ are not totally reflected at the exit surface 5b. In the above expression, α: inclination of a tangent to the exit surface 5b, β: inclination of the side surface $5d_1$ or $5d_2$ (reflecting surface), or maximum value of the inclination of a tangent to the side surface $5d_1$ or $5d_2$ if the side surface $5d_1$ or $5d_2$ is a curved surface, $\theta_{max}$: maximum value of the incident angle, n: refractive index of the material of the optical member 5.

A second embodiment of the present invention will be described below. In the first embodiment, the light intensity distribution differs between a central portion and a marginal portion of the exit surface, and the center of the light intensity distribution gradually shifts toward the outside from point to point toward the marginal portion. Accordingly, the tendency of distribution on an illuminated plane is such that the illuminated plane is bright in its central portion and becomes gradually darker toward its marginal portion.

The second embodiment ameliorates such tendency by forming the exit surface as a curved surface having a positive refractive power (the shape of the curved surface is arbitrary, as described previously), and realizes an illuminating optical system having a small size and a high directionality.

Figure 10:
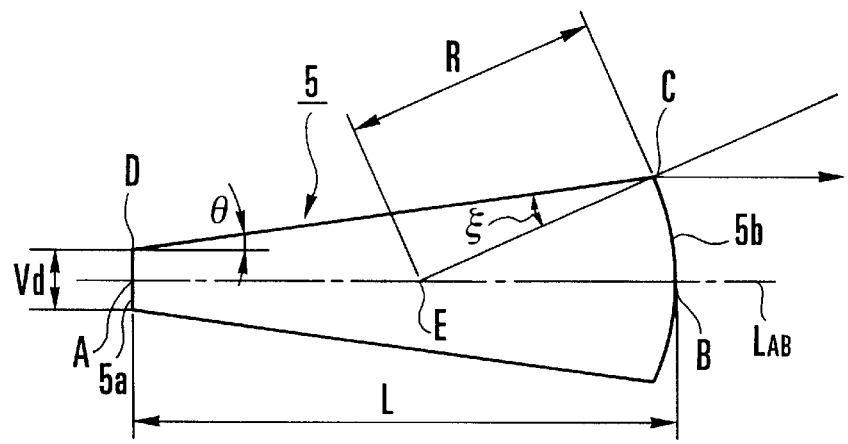
FIG. 10 is an explanatory view of an optical member in a second embodiment of the present invention.

FIG. 10 shows symbols which denote the elements required for forming the exit surface 5b as a curved surface. Symbol R denotes the radius of curvature of the exit surface 5b.

The optical action of an optical member according to the second embodiment, which uses a spherical surface (lens surface) as a curved surface to be provided as an exit surface having a positive refractive power, will be described below. If the exit surface 5b formed in the shape of a spherical surface (lens surface) having a positive refractive power is applied to a light guide portion which has the minimum inclination angle θ similar to the shape shown in FIG. 3, the illuminating angle distribution at the central portion B of the exit surface 5b and the illuminating angle distribution at the end C are approximately the same, and there is no substantial difference between the exit angle $\beta_b$ and each of the exit angles $\beta_{Ci}$ and $\beta_{Co}$.

In this case, the light distribution on the illuminated plane is ideal because, as shown in FIG. 8, it is flat and uniform as a whole and sharply lower outside a desired illumination area. In such a case where the inclination angle θ is small, if a surface of large curvature is formed as the exit surface 5b, diffusion of light occurs and the desired effect cannot be obtained.

If a curved surface having a positive refractive power is applied to an optical member which is a light guide portion having a medium inclination angle θ similar to the light guide portion shown in FIG. 2, the light distribution at the central portion B and the light distribution at the end C are substantially equal to the illuminating angle itself, but the centers of exiting light beams are inclined. This phenomenon successively occurs from point to point on the exit surface, and the center of the exiting direction gradually shifts from the central portion toward the marginal portion until a substantially maximum shift value is reached at the end C.

As compared with the state in which the curved surface is applied to the exit surface shown in FIG. 3, the light distribution at the illuminated surface is such that the amount of illuminating light is slightly or moderately lower in the marginal portion, and an actually effective illumination area (the area having an intensity which is 50% of that in the center) becomes narrow and the amount of light loss increases. If an optical member which has a maximum inclination angle θ similar to the light guide portion shown in FIG. 4 is used, the tendency of light distribution becomes similar to that obtained when the aforesaid curved surface is applied to the exit surface 5b shown in FIG. 2, but such tendency increases, i.e., light distribution becomes more nonuniform and the amount of light loss increases. In the second embodiment, the characteristics of such an optical member having top and bottom surfaces formed of plane surfaces are effectively corrected with the curved surface formed as the exit surface.

A most basic correction method will be described below. Since the center of the light intensity distribution at the end C of the exit surface is approximately coincident with the inclination angle θ of the top (or bottom) surface, it is effective to perform the correction of causing the rays at the end C to exit approximately in parallel with the optical axis $L_{AB}$ by means of the curved surface. In addition, it is necessary to gradually vary the characteristics of the curved surface without exerting the influence of the curved surface on a central portion centered about the optical axis $L_{AB}$.

The second embodiment is based on this theory, and performs correction with a method such as that shown in FIG. 10 which is a schematic cross-sectional view of an optical member. Specifically, a surface having a radius of curvature R centered at a point E on the optical axis $L_{AB}$ is used as a correcting surface so that a ray which advances at the inclination angle θ along a line DC which connects an end D of the entrance surface 5a and the end C of the exit surface 5b is refracted at the curved surface and advances in a direction parallel to the optical axis $L_{AB}$.

The numerical relation at the end C is expressed as:

$$n \sin \xi = \sin(\xi + \theta), \quad (2)$$

where n: refractive index of the material of the optical member,

ξ: incident angle for making the center of light distribution after refraction at the end C approximately parallel to the optical axis.

If an optimum radius of curvature R for the exit surface 5b is found from the relation shown in FIG. 10, $$R = \left(L\tan\theta + \frac{V_d}{2}\right)\sqrt{\frac{1+\tan^2(\theta+\xi)}{\tan^2(\theta+\xi)}}. \quad (3)$$

An approximately optimum radius of curvature R is obtained by obtaining the height $V_d$ from the relation of Expression (2) and substituting the obtained value in Expression (3).

Figure 11:
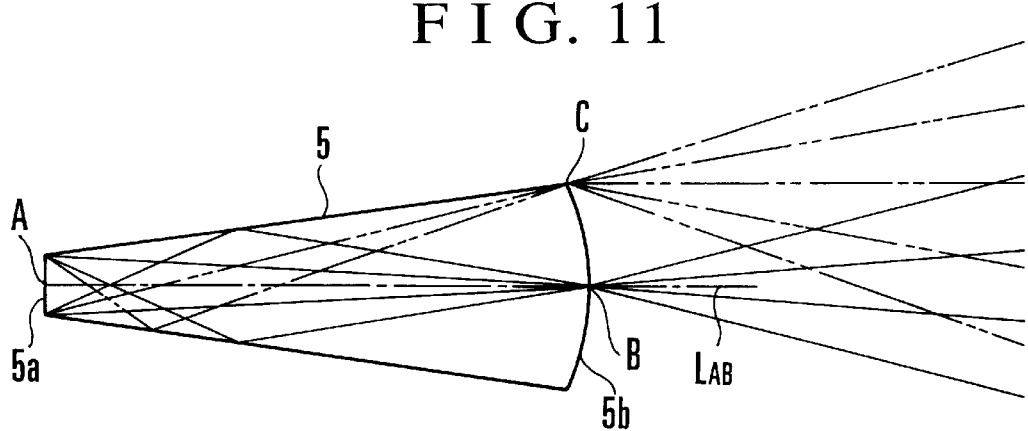
FIG. 11 is an explanatory view of an optical member in the second embodiment of the present invention.
Figure 12:
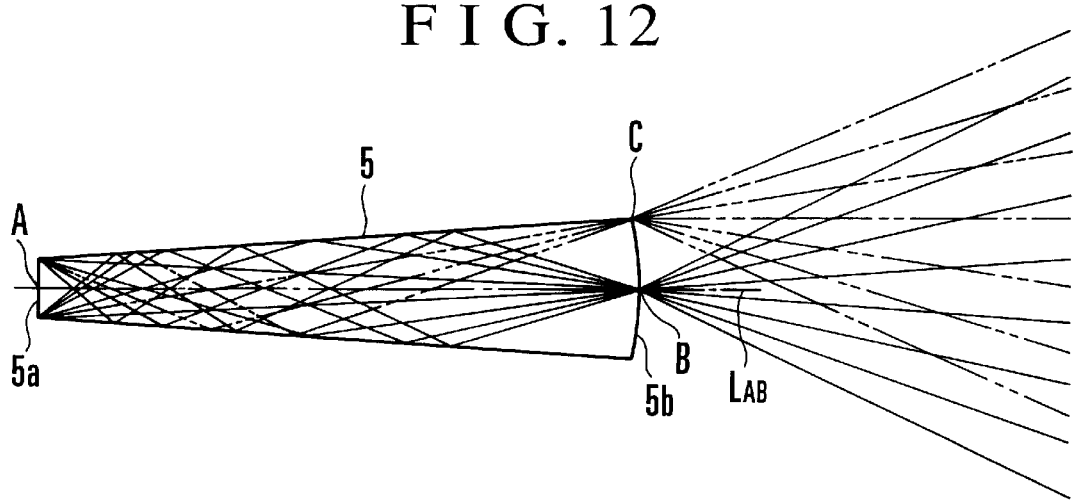
FIG. 12 is an explanatory view of an optical member in the second embodiment of the present invention.
Figure 13:
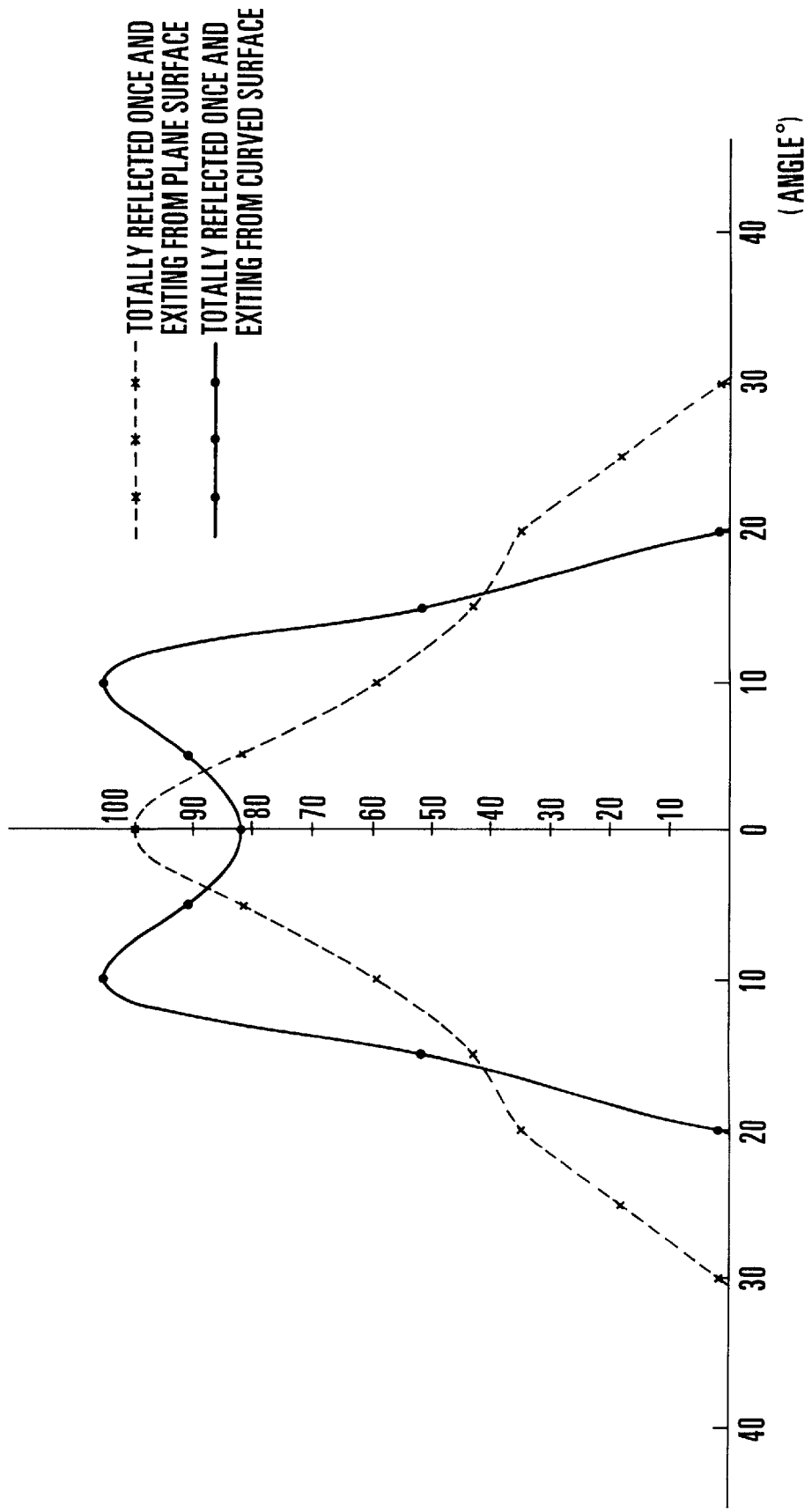
FIG. 13 is an explanatory view of light distribution characteristics of the optical member in the second embodiment.
Figure 14:
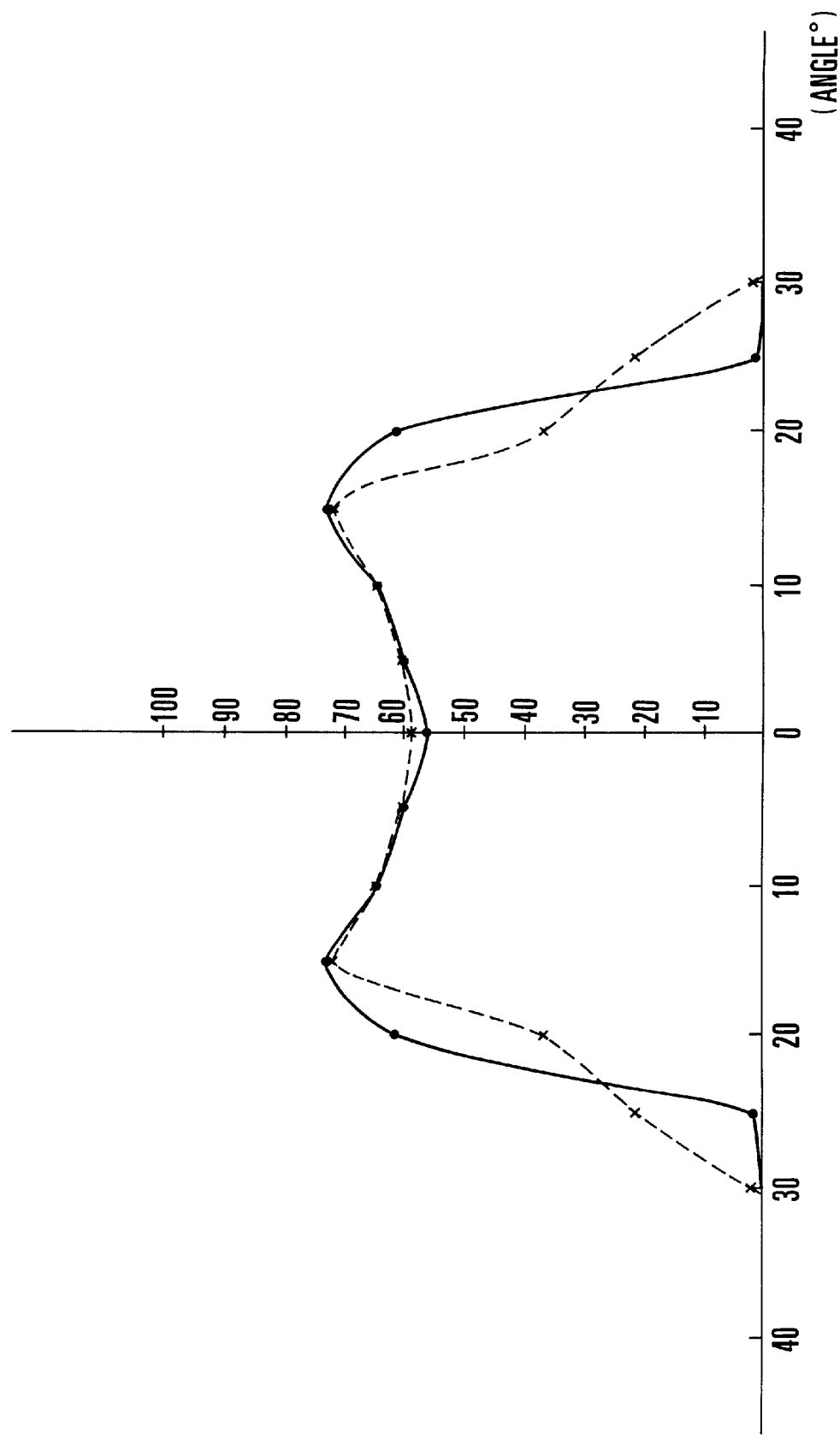
FIG. 14 is an explanatory view of light distribution characteristics of the optical member in the second embodiment.

FIGS. 11 and 12 respectively show light guide members which have shapes corresponding to the optical members shown in FIGS. 5 and 6, and whose exit surfaces 5b respectively have curvatures so that the above expression (3) is satisfied. FIGS. 13 and 14 show one example of a variation in light distribution characteristic before and after such a curvature is given to the exit surface 5b.

As can be seen from FIGS. 11 and 12, if the light intensity distribution at the entrance surface 5a is uniform, it is possible to achieve approximately uniform light distribution on the exit surface 5b at each point from the center to the margin of the exit surface 5b.

An actual numerical example is shown below. If the values shown in FIGS. 5 and 6 are the same, the $\xi$ and R of each of the light guide portions shown in FIGS. 11 and 12 take on the following values from Expressions (2) and (3):

$\xi_1 = 16°$     $R_1 = 8.9$, $\xi_2 = 8°$     $R_2 = 12.0$.

FIGS. 13 and 14 show the actual light distribution characteristics of an emission tube which were measured in a diametrical cross-section thereof under the conditions that, in the configuration shown in FIG. 1, a cylindrical light source was disposed at a distance of 1 mm from the entrance surface of the optical member and the portion of the light source which excluded a portion through which emitted light entered the optical member was covered with a reflecting mirror.

In FIG. 13, the light distribution characteristics obtained when the optical member of FIG. 5 was used are shown by a dashed line, while the light distribution characteristics obtained when the optical member of FIG. 11 was used are shown by a solid line. By forming the exit surface 5b as a curved surface, the following effects are obtained.

First of all, components which are present in a marginal portion of an angle of view and are smaller in intensity than central components and do not contribute to actual illumination are shifted toward the optical axis $L_{AB}$, so that approximately uniform light distribution are obtained over a central wide area.

Accordingly, actually effective components in a region whose intensity is 50% of the intensity on the optical axis increase to a great extent, so that it is possible to achieve highly efficient low-loss illumination. In addition, since it is not necessary to increase the length of the optical member to obtain these characteristics, the entire shape of the optical member can be minimized.

In the shown example, the illumination area is greatly reduced from 60° to 40°, and the light intensity distribution within the illumination area is kept approximately uniform. The distribution of the shown example has peaks at opposite positions each spaced 10° apart from the central portion. This distribution depends on the characteristics of light to be made incident on the entrance surface of the optical member, i.e., light intensity distribution characteristics restricted by the light source or the reflecting mirror, and the reason why the distribution occurs is that, in the above construction, light beams which should originally lie at or near the center run short owing to the curved surface formed as the exit surface.

In such an optical member in which the number of total reflections is comparatively small, since the light intensity distribution of light to be made incident on the entrance surface affects final light distribution characteristics, the following correction is effective.

(c1) The light intensity distribution of light to be made incident on the optical member is made uniform independently of the characteristics of a light source (the entrance surface is made a diffusing (scattering) surface, or a diffusing (scattering) surface is inserted before the entrance surface).

(c2) The manner of correction of a curved surface to be formed as the exit surface is set not so that the centers of light intensity distributions at all points are made coincident with one another, but so that the center of light intensity distribution is shifted at a predetermined rate for each point and the shifted centers are made to overlap one another.

In particular, for the correction (c2), it is desirable to adopt a method of setting the curvature of the exit surface by varying it in a predetermined amount from the value of Expression (3) or a method of forming not a simple curved surface such as a spherical surface but an arbitrary curved surface capable of correcting the light distribution of light to be made incident on the entrance surface.

In the aforesaid method of setting the curvature, it is to be noted that if the curvature is made excessively large, part of light beams are totally reflected at the exit surface and the light beams cannot be effectively used, whereas if the curvature is excessively small, no sufficient correction is achieved and effective light-gathering control becomes impossible.

It is, therefore, effective to make the curvature closer to the radius of curvature expressed by Expression (3), particularly in a marginal portion of the exit surface within an area in which total reflection does not occur. If it is necessary to prevent total reflection from occurring in the marginal portion of the exit surface, it is effective to increase the curvature in the marginal portion only. This total reflection occurs under the following conditions.

Letting $\alpha$ be a maximum angle of incidence of light on the entrance surface and letting N be the total number of total reflections, the following condition is obtained from the exiting condition under which a maximum angle occurs at the end C, $\xi+\theta+\{\sin^{-1}((\sin \alpha)/n)-2(N+1)\theta\} \leq \sin^{-1}(1/n)$.

The curvature substantially becomes a maximum if N=1, and it is necessary to satisfy the following condition:

$\xi \leq \sin^{-1}(1/n)-\sin^{-1}((\sin \alpha)/n)+3\theta$.

If this condition is not satisfied, to increase the curvature of the marginal portion is effective for enabling light to exit efficiently.

Although in the second embodiment the exit surface is formed as a curved surface which serves as a lens portion having a positive refractive power, the exit surface is not limited to only this shape, and may be an aspherical surface as described previously, or a plate-shaped lens such as a Fresnel lens may also be used for space saving.

Although in the second embodiment an ideal curved surface has been described above, even a shape close to the ideal curved surface can work substantially effectively, and the radius of curvature R obtained from Expressions (2) and (3) is approximately effective between a minimum value $R_{min}$R=R/2 and a maximum value $R_{max}$=2R.

Figure 15:
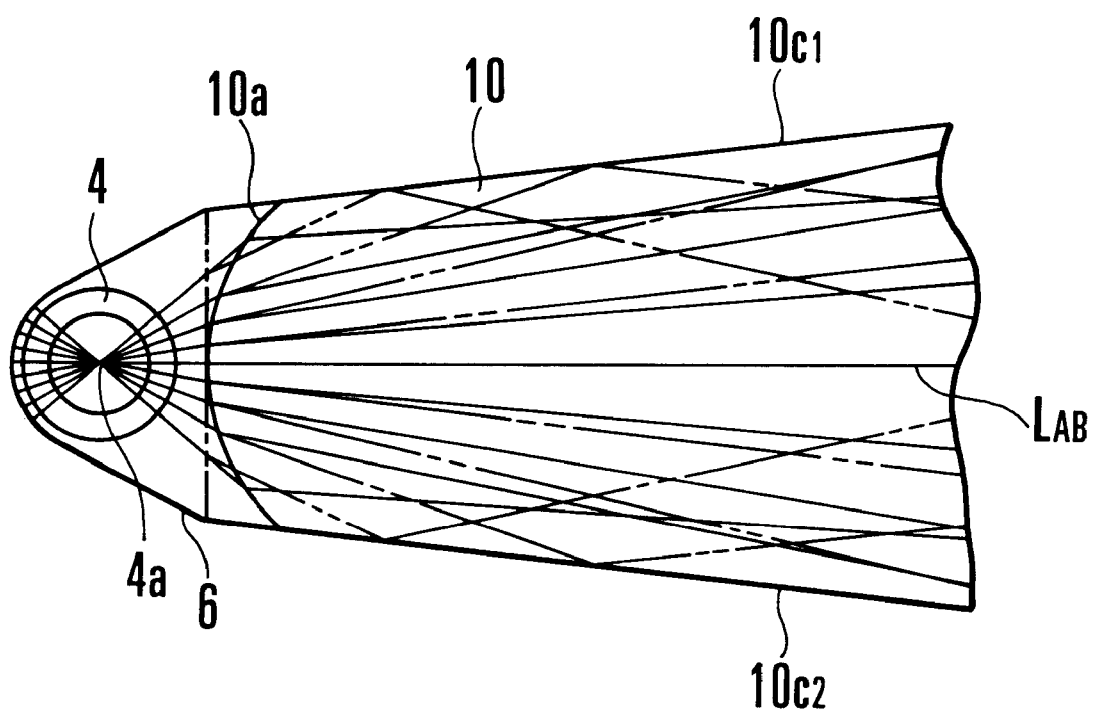
FIG. 15 is a diagrammatic cross-sectional view of the essential portion of an illuminating device according to a third embodiment of the present invention.

A third embodiment of the present invention will be described below with reference to FIG. 15. The third embodiment is intended to efficiently project light beams with their directionality improved within a narrow space by using the light distribution characteristic of a light source disposed in the vicinity of the entrance surface. FIG. 15 further shows representative ray traces similarly to the ray-tracing diagrams of the first and second embodiments.

The feature of the third embodiment is that a curved surface having a positive refractive power is formed as an entrance surface 10a. The third embodiment will be described below with reference to FIG. 15.

In FIG. 15, reference numeral 4 denotes a flash discharge tube, reference numeral 6 denotes a reflecting mirror, reference numeral 10 denotes an optical member, and the entrance surface 10a is formed as a curved surface having a positive refractive power. In FIG. 15, ray traces are also shown by solid lines. Furthermore, ray traces through an entrance surface which is formed of a plane surface similarly to the entrance surfaces of the first and second embodiments are shown by two-dot chain lines for the sake of comparison.

In general, the emission surface of the flash discharge tube 4 which is a light source is smaller than the entrance surface 10a of the optical member 10, and a great number of components (rays) which tend to diverge along the optical axis $L_{AB}$ are present at the entrance surface 10a. Although FIG. 15 shows the ray traces of light beams emitted from the central portion of the flash discharge tube 4, almost all components, some of which advance from the flash discharge tube 4 directly to the entrance surface 10a and the other of which are reflected by a rearward portion of the reflecting mirror 6 and again pass through the flash discharge tube 4 and are made incident on the entrance surface 10a, exhibit characteristics similar to the ray traces of the light beams shown in FIG. 15. If light-gathering performance is to be increased by using the positional relation between such light source and the entrance surface 10a, it is effective to form the entrance surface 10a as a curved surface having a positive refractive power.

As shown, the third embodiment makes it possible to increase light-gathering performance to a great extent, as compared with an optical member of the type which has an entrance surface formed of a plane surface. The third embodiment further has the effect of reducing the entire length of the optical member even in the case of a construction which is intended to improve directionality by making use of the inclined surfaces of the top and bottom surfaces $10_{c1}$ and $10_{c2}$, as described previously in connection with the first embodiment. Furthermore, if the third embodiment is combined with a construction of the type in which the entrance surface is formed as a curved surface, as described previously in connection with the second embodiment, the curvature of the entrance surface can be made moderate, so that it is possible to achieve effects such as a decrease in the loss of the amount of light and an improvement in the use efficiency of light.

In each of the second and third embodiments, the curved surface of a normal lens portion is used as a curved surface to be formed as an entrance surface or an exit surface. However, the present invention is not limited to only such curved surface, and may also use arbitrary inclined surfaces, a quadratic surface, a Fresnel lens or the like.

Figure 16:
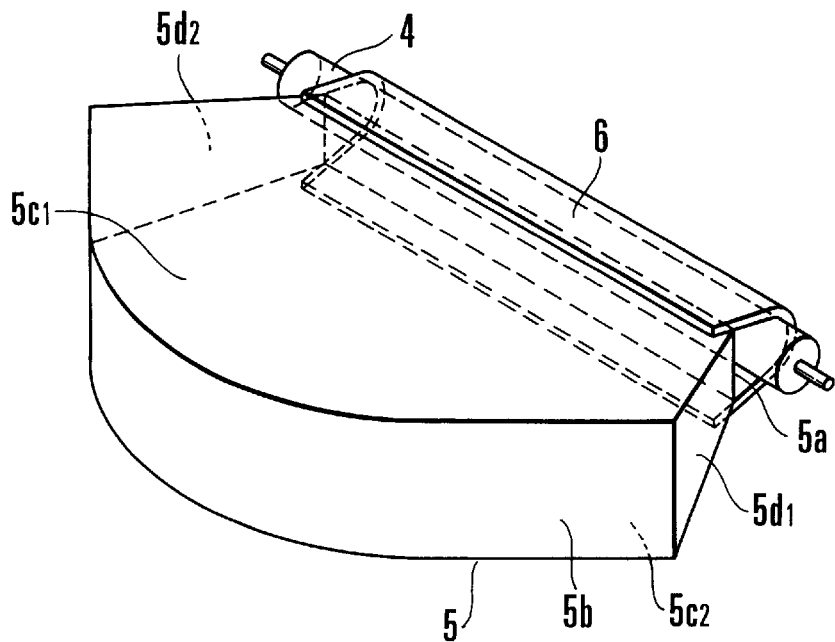
FIG. 16 is a diagrammatic perspective view of the essential portion of an illuminating device according to a fourth embodiment of the present invention.
Figure 17:
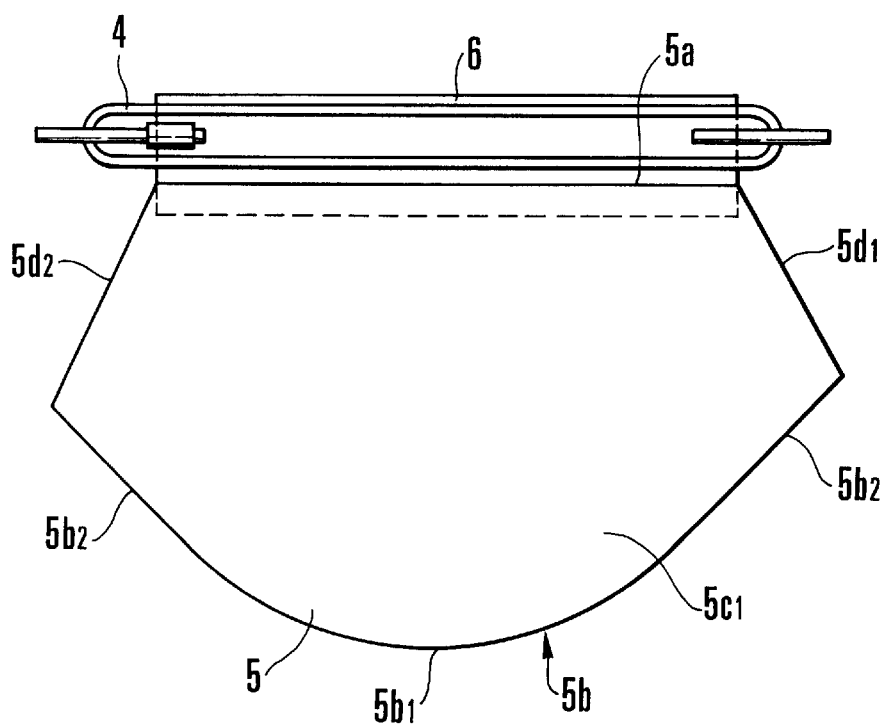
FIG. 17 is a diagrammatic plan view of the essential portion of the illuminating device according to the fourth embodiment of the present invention.
Figure 18:
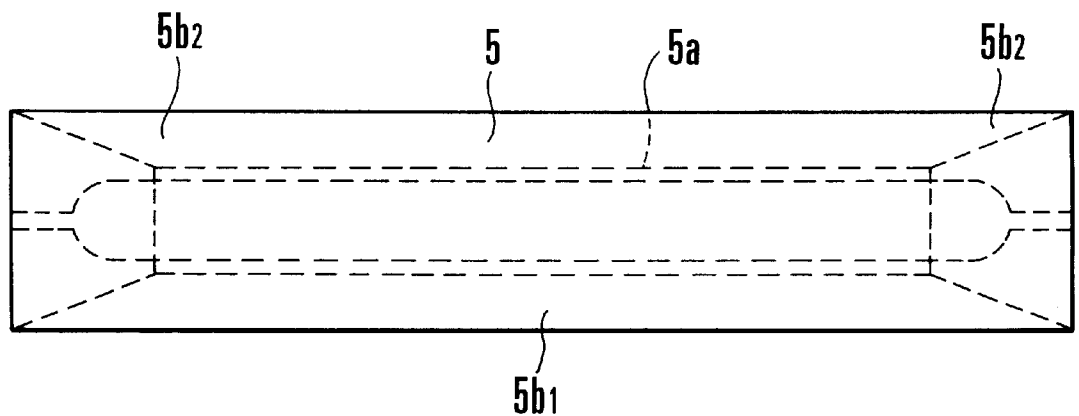
FIG. 18 is a diagrammatic front view of the essential portion of the illuminating device according to the fourth embodiment of the present invention.

FIG. 16 is a diagrammatic perspective view showing the essential portion of a fourth embodiment of the illuminating device according to the present invention, and FIGS. 17 and 18 are diagrammatic plane and front views showing the essential portion. In FIG. 16, identical reference numerals are used to denote constituent elements identical to those shown in FIG. 1.

The fourth embodiment merely differs from the first embodiment shown in FIG. 1 in the following respects and so on.

(d1) The exit surface 5b includes a curved surface $5_{b1}$ of positive refractive power which is formed in a central portion centered about the optical axis, and plane surfaces $5_{b2}$ adjacent to the curved surface $5_{b1}$ which are formed in opposite marginal portions.

(d2) Each of the plane surfaces $5_{b2}$ has the inclination α defined by the aforesaid expression (1).

(d3) Each of the top and bottom surfaces $5c_1$ and $5c_2$ is made from a free curved surface (a surface of arbitrary shape such as a curved surface or an asymmetrical curved surface) which is formed by continuously arranging envelopes which connect the planes defined by the entrance surface 5a and the exit surface 5b.

In the optical member 5 according to the fourth embodiment, the curvature of the curved surface $5_{b1}$ in the central portion of the exit surface 5b is made as large as possible so that the curved surface $5_{b1}$ can be reduced in size (the optical member 5 can be shortened), and each of the marginal portions of the exit surface 5b is formed as the plane surface $5_{b2}$ having the maximum angle a calculated from the aforesaid expression (1), and the curved surface $5_{b1}$ and each of the plane surfaces $5_{b2}$ are defined to adjoin each other.

With this construction, it is possible to realize a highly efficient light-gathering optical system having the required minimum size which is free of the loss of the amount of light due to total reflection at the exit surface 5b.

Figure 19:
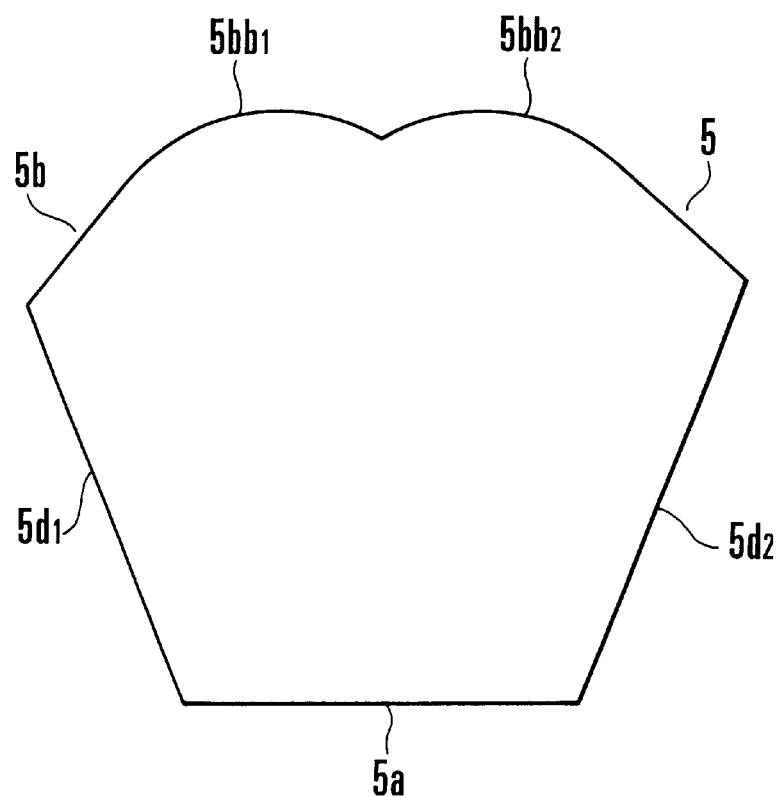
FIG. 19 is a diagrammatic plan view of the essential portion of an illuminating device according to a fifth embodiment of the present invention.

FIG. 19 is a diagrammatic view showing the essential portion of an optical member which constitutes a fifth embodiment of the illuminating device according to the present invention. The fifth embodiment merely differs from the fourth embodiment shown in FIG. 16 in that a plurality of (in FIG. 19, two) convex surfaces $5bb_1$ and $5bb_2$ for gathering light are provided adjacent to each other in a central portion of the exit surface 5b.

The shape of the exit surface is not limited to one curved surface and can also be formed of a plurality of curved surfaces, and by forming the exit surface from a plurality of curved surfaces, it is possible to impart an intentional deviation to light distribution within the illumination area.

Although in the fifth embodiment two convex surfaces having substantially the same shape are formed, the present invention is not necessarily limited to such a shape, and may also use two larger and smaller convex surfaces or more than two convex surfaces.

By partly correcting the shape in the above-described manner, it is possible to appropriately correct a local light distribution on the illuminated plane.

Figure 20:
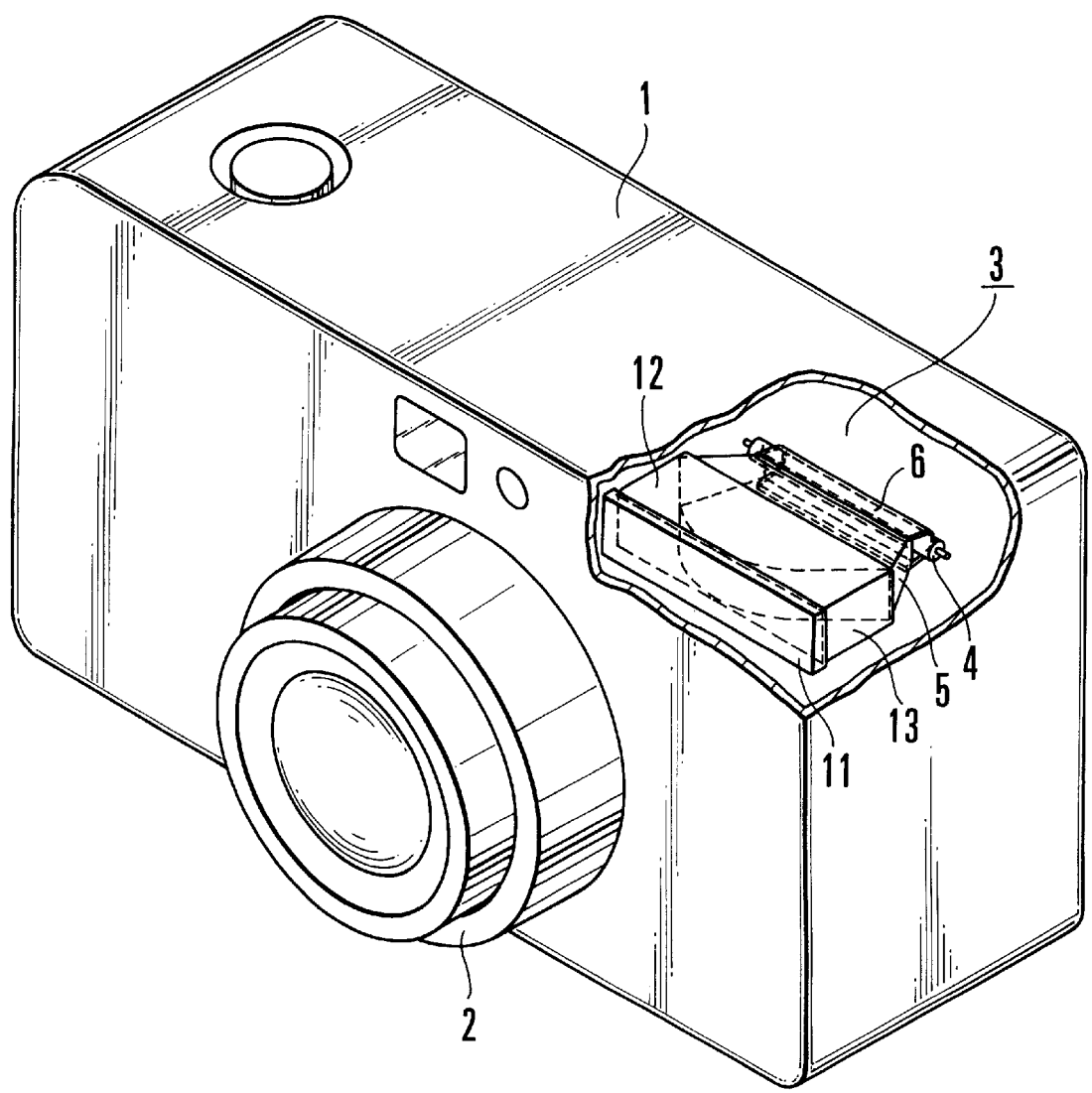
FIG. 20 is a diagrammatic perspective view of the essential portions of an illuminating device according to a sixth embodiment of the present invention, which is provided in a top portion of a camera body.

FIG. 20 is a diagrammatic view showing the essential portion of a sixth embodiment in which the illuminating device 3 according to the present invention is fitted in the camera body 1. In FIG. 20, identical reference numerals are used to denote constituent elements identical to those shown in FIG. 1.

The sixth embodiment merely differs from the first embodiment shown in FIG. 1 in the following respects and so on.

(e1) A wedge-shaped transparent member (front panel) 11 for deflecting transmitted light beams in a downward direction or toward a photographing lens is provided in front of the exit surface 5b of the optical member 5.

(e2) Reflecting plates 12 are respectively provided on the top and bottom surfaces of the optical member 5, while reflecting plates 13 are respectively provided on the side surfaces of the optical member 5. Each of the reflecting plates 12 and 13 has an inner surface formed as a reflecting surface for guiding light beams into the optical member 5 so that the light beams exiting from the optical member 5 are prevented from being absorbed in the camera body 1.

(e3) The exit surface 5b of the optical member 5 has a curved central portion centered about the optical axis and plane marginal portion distant from the optical axis.

Figure 21:
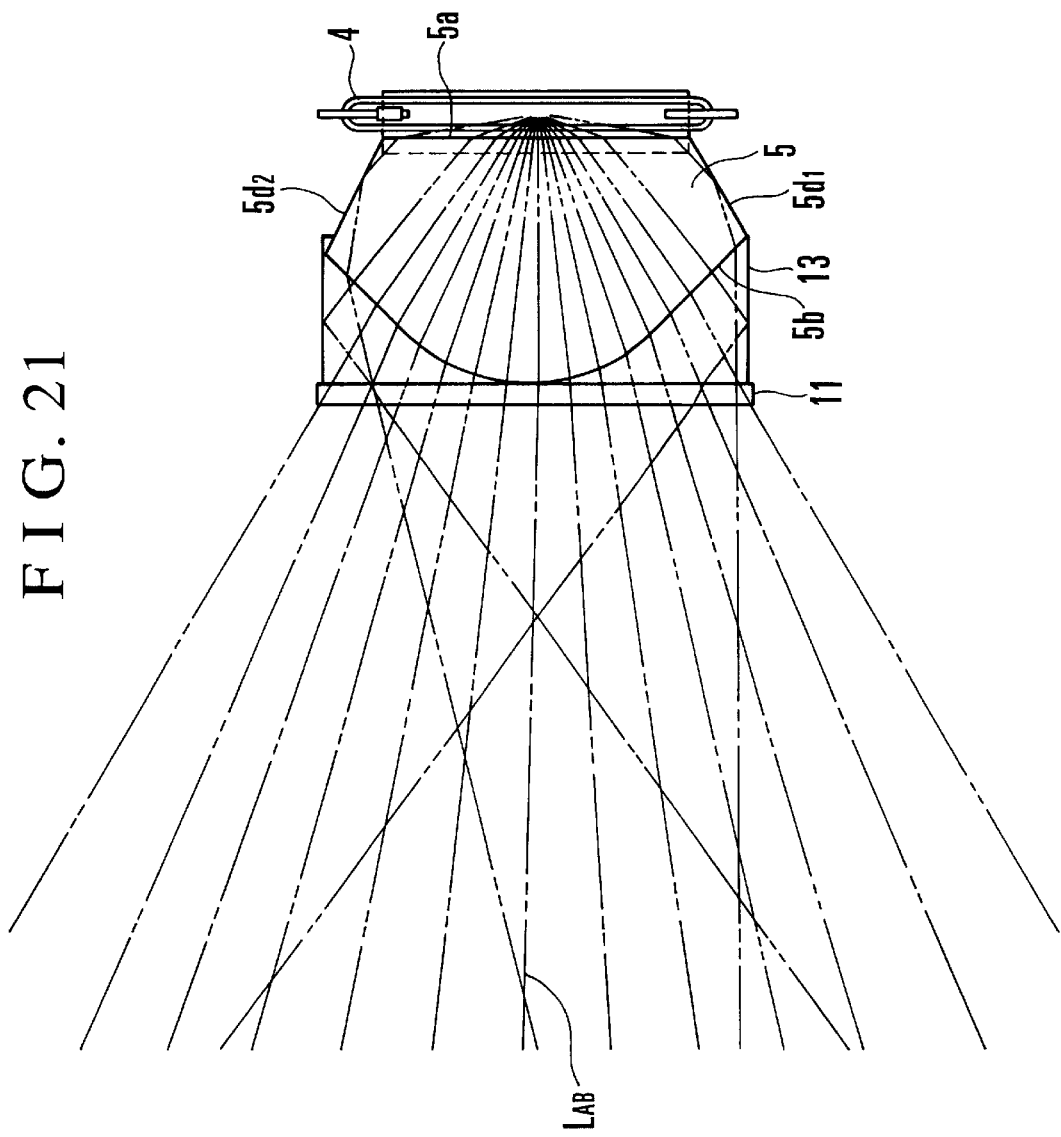
FIG. 21 is a diagrammatic cross-sectional view of the essential portion of the illuminating device according to the sixth embodiment of the present invention.
Figure 22:
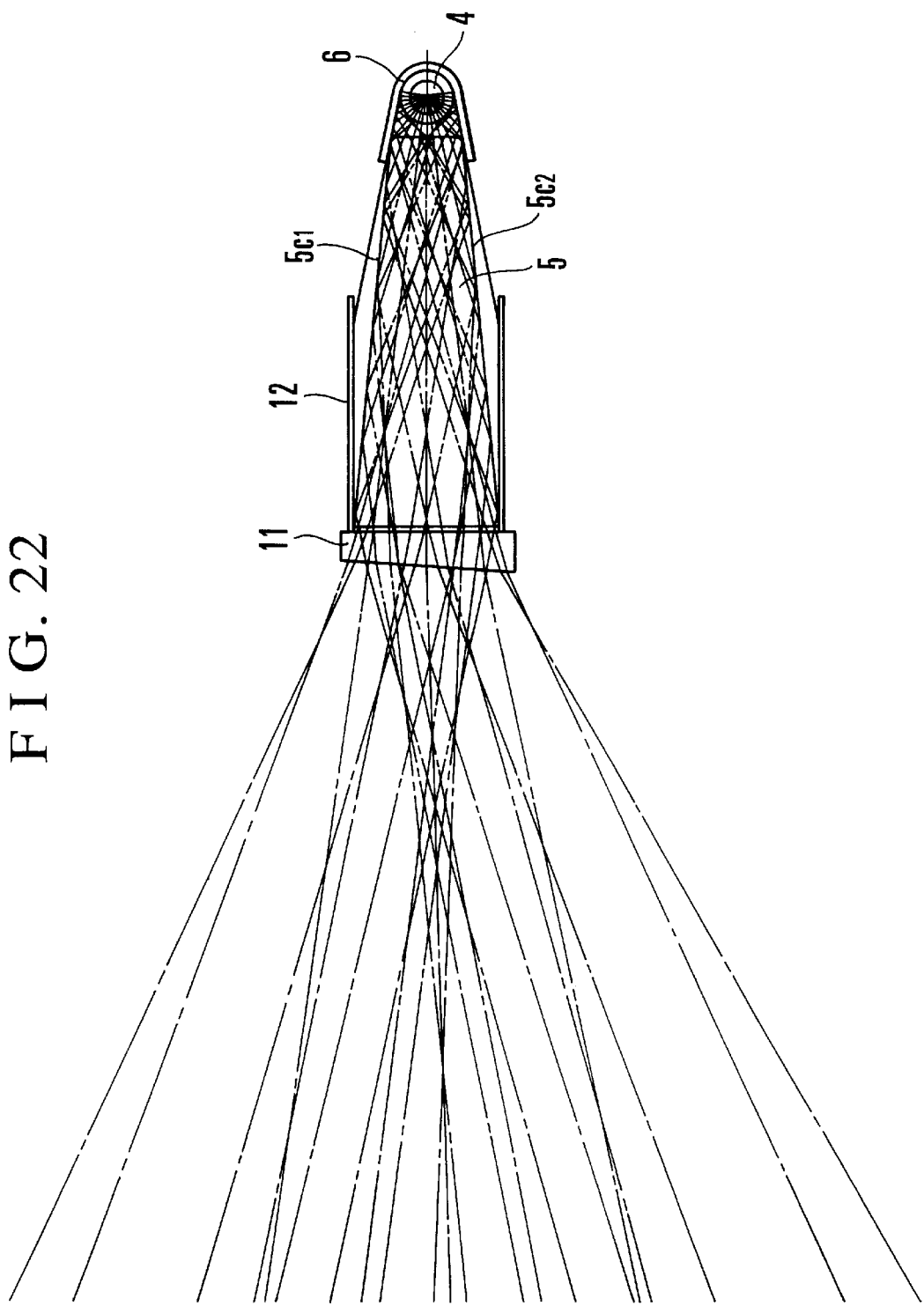
FIG. 22 is a diagrammatic cross-sectional view of the essential portion of an illuminating device according to the sixth embodiment of the present invention.

FIG. 21 is a diagrammatic plan view showing the essential portion of the illuminating device 3 shown in FIG. 20, and FIG. 22 is a diagrammatic cross-sectional view showing the essential portion of the illuminating device 3 shown in FIG. 20. Each of FIGS. 21 and 22 shows an optical path along which light beams emitted from the flash discharge tube 4 are radiated toward the object side through the optical member 5 and the wedge-shaped transparent member 11.

As shown in FIGS. 21 and 22, light beams emitted from the flash discharge tube 4 are refracted once at the entrance surface 5a of the optical member 5 and reach the exit surface 5b and are gathered by the large curvature of the exit surface 5b.

After some of the light beams have exited from the exit surface 5b, they are reflected at the reflecting plates 12 or 13 and exit from the front panel 11. The front panel 11 has a uniform thickness in cross section and therefore does not affect light distribution.

On the other hand, from among the light beams emitted from the flash discharge tube 4, light beams having particularly large incident angles to the entrance surface 5a of the optical member 5 are totally reflected once at the side surfaces $5d_1$ and $5d_2$ and are refracted at and exit from the exit surface 5b.

In this manner, components having large incident angles are also effectively controlled by using the total reflections at the side surfaces $5d_1$ and $5d_2$.

However, as described previously, if reflections at the side surfaces $5d_1$ and $5d_2$ are used in this manner, light beams are totally reflected at the exit surface 5b and the loss of the amount of light may occur.

In the sixth embodiment, in view of this point, the inclination of each of the side surfaces $5d_1$ and $5d_2$ is set to $\beta=30°$, the inclination of the exit surface 5b is set to $\alpha=45°$, the length L of the optical member 5 is set to 15.0, and the length in the X direction of the optical member 5 is set to 26.0, so that the loss of the amount of light substantially does not occur at the exit surface 5b.

As can also be seen from the shape of the optical member 5 shown in FIG. 21, the optical member 5 is asymmetrical about the optical-axis center of an emission part composed of the flash discharge tube 4 and the reflecting mirror 6. In particular, the exit surface 5b is decentered toward the left (in FIG. 21, toward the top) with respect to the optical axis $L_{AB}$.

Accordingly, when light beams pass through the optical member 5, the centers of the light beams are shifted toward the left. This is intended to effect efficient illumination (to correct parallax) by inclining an illuminating direction toward the left by a predetermined amount with respect to an object lying at a finite distance (for example, 2 m), because the emission part of the flash discharge tube 4 is located on the top right side of the photographing optical system of the camera, as shown in FIG. 20.

FIG. 22 shows a vertical section which contains the center of the flash discharge tube 4, and also shows ray traces of light beams emitted from an approximate center (the optical-axis center) of the flash discharge tube 4.

As shown in FIG. 22, components (light beams) having small incident angles to the optical member 5 directly exit from the optical member 5, while components having large incident angles are repeatedly totally reflected at the top and bottom surfaces $5c_1$ and $5c_2$ of the optical member 5 and exit from the optical member 5 in an approximately constant direction. Although not shown, marginal light beams, which have large inclinations with respect to the top and bottom surfaces $5c_1$ and $5c_2$ of the optical member 5, are also approximately similarly controlled and gathered.

In this case, although a light-gathering portion is short and the distance to the front panel 11 is long, the light distribution of the light beams gathered in the light-gathering portion is retained and projected toward an object owing to the presence of the reflecting plates 13.

In addition, in the sixth embodiment, the front panel 11 has a varying thickness in cross section, as shown in FIG. 22. This is intended to correct parallax similarly to the horizontal sectional shape shown in FIG. 21. Since the optical-axis center needs to be directed downward in the layout of the camera shown in FIG. 20, the front panel 11 is made gradually thicker from the top to the bottom, as shown in FIG. 22, so that the optical-axis center is directed downward by a predetermined amount.

Incidentally, the horizontal thickness of the front panel 11 may also be varied so that light beams can be deflected in a horizontal direction. In addition, the optical-axis center of the flash discharge tube 4 and the illumination optical axis $L_{AB}$ of the optical member 5 and the exit surface 5b are decentered from each other to enhance illumination efficiency.

The sixth embodiment may also be arranged in the following manners.

(f1) The exit surface of the optical member has a curved surface of rectangular shape, and the curved surface of rectangular shape is inclined with respect to the entrance surface of the optical member.

(f2) The exit surface of the optical member is formed by a plurality of curved surfaces which are provided asymmetrically with respect to the normal to the entrance surface of the optical member.

By combining the above-described constructions, it is possible to realize a highly efficient thin-sized illuminating device capable of optimally coping with a cylindrical light source while taking account of parallax correction.

Figure 23:
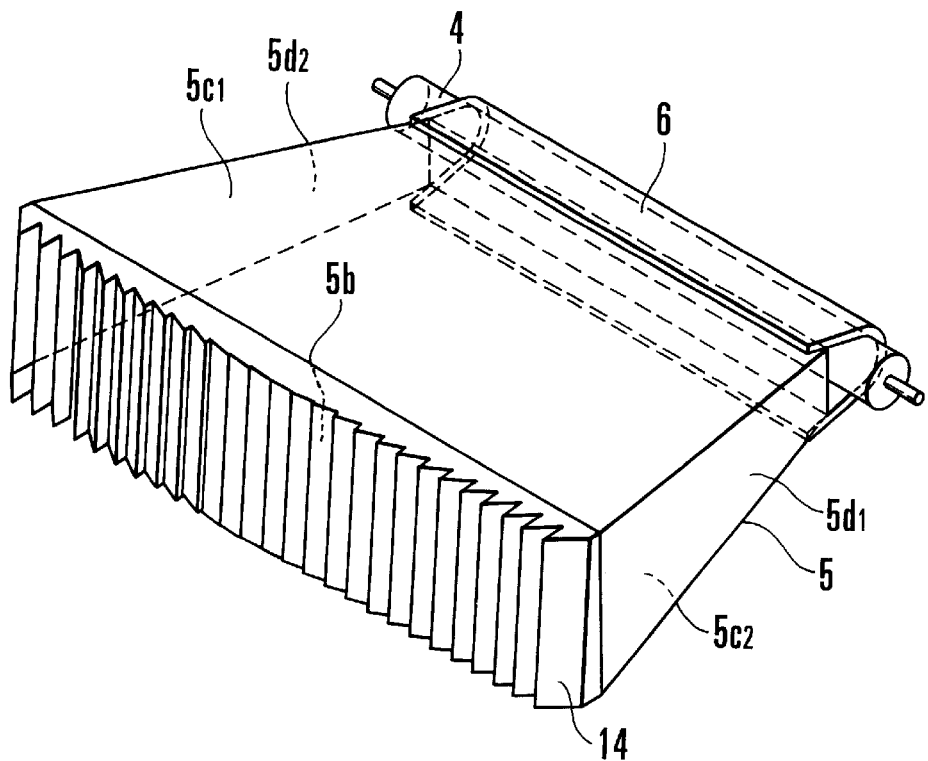
FIG. 23 is a diagrammatic perspective view of the essential portion of an illuminating device according to a seventh embodiment of the present invention.
Figure 24:
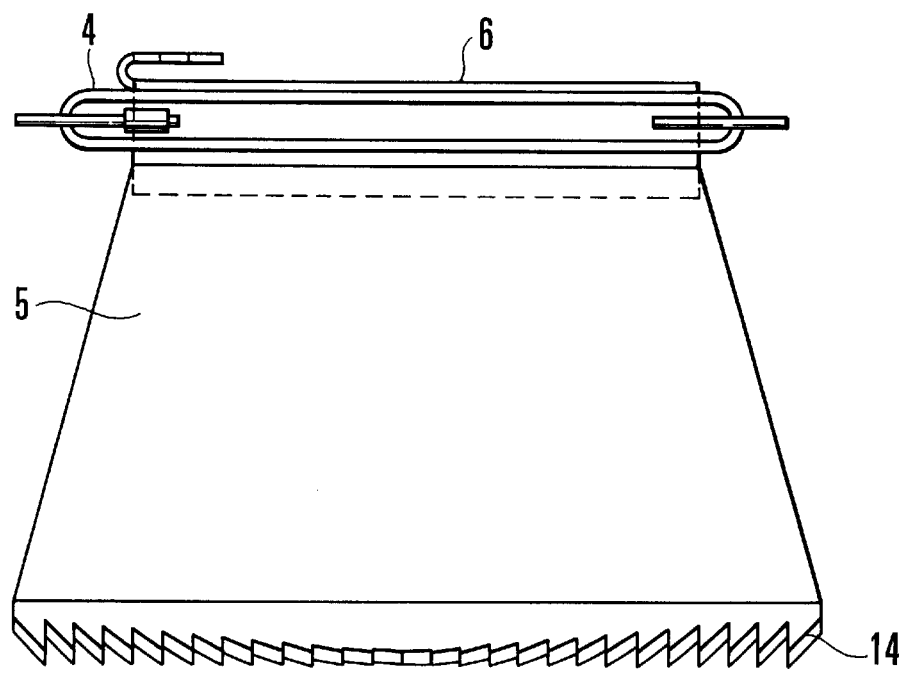
FIG. 24 is a diagrammatic plan view of the essential portion of the illuminating device according to the seventh embodiment of the present invention.

FIG. 23 is a diagrammatic perspective view showing the essential portion of a seventh embodiment of the illuminating device according to the present invention. FIG. 24 is a diagrammatic plan view of the essential portion shown in FIG. 23.

In the sixth embodiment shown in FIG. 20, as the curvature of the exit surface 5b of the optical member 5 is made larger, the side portions of the optical member 5 are inserted to a deeper position if the illuminating device is incorporated in the body of an optical apparatus (or the camera body).

For this reason, in the seventh embodiment, in order to miniaturize the entire illuminating device, a Fresnel lens 14 having a positive refractive power in the horizontal (X) direction is bonded to or spaced a slight distance apart from the exit surface 5b of the optical member 5.

In FIGS. 23 and 24, identical reference numerals are used to denote constituent element identical to those shown in FIG. 1. In the seventh embodiment, the Fresnel lens 14 is provided on the exit surface so as to efficiently gather light beams emitted from the flash discharge tube 4 and project the light beams toward an object side.

Incidentally, in the seventh embodiment, the surface of the Fresnel lens 14 may be obliquely inclined to decenter the optical-axis center of the Fresnel lens 14 from the optical-axis center of the emission part so that parallax correction is effected.

In the seventh embodiment, the top and bottom surfaces $5c_1$ and $5c_2$ and the side surfaces $5d_1$ and $5d_2$ of the optical member 5 may also be plane surfaces so that production of the optical member 5 is facilitated.

Incidentally, a photographing apparatus (such as a camera) according to the present invention is arranged in such a manner that any of the illuminating devices of the respective embodiments is fixedly or slidably fitted in a part of the body of the camera so as to illuminate an object side with high illumination efficiency.

I claim:

1. A flash device comprising:

a light source; and an optical system for projecting light emitted from said light source onto an object, said optical system having a transparent member which is tapered toward said light source, said transparent member having an entrance surface, an exit surface, and a reflecting surface lying between the entrance surface and the exit surface, said entrance surface and said exit surface being located on a straight extending optical axis, and a portion of the light emitted from said light source being made incident on the entrance surface and then exiting from the exit surface after having been reflected at the reflecting surface.

2. A flash device according to claim 1, wherein said optical system has a concave mirror for reflecting the light emitted from said light source toward the entrance surface.

3. A flash device according to claim 1, wherein said transparent member is made of plastic or glass.

4. A flash device according to claim 1, wherein the reflecting surface is formed by a total reflection surface or a surface having a reflecting film.

5. A flash device according to claim 1, wherein the entrance surface has a positive refractive power.

6. A flash device according to claim 1, wherein the exit surface has a positive refractive power.

7. A flash device according to claim 6, wherein the entrance surface has a positive refractive power.

8. A flash device according to claim 6, wherein the exit surface has a convex surface having the positive refractive power in its central portion and an inclined plane surface in its marginal portion.

9. A flash device according to claim 6, wherein the exit surface has a convex surface having a positive refractive power.

10. A flash device according to claim 6, wherein the exit surface has a Fresnel lens having a positive refractive power.

11. A flash device according to claim 6, wherein the exit surface has a plurality of convex surfaces each having a positive refractive power.

12. A flash device according to claim 11, wherein the plurality of convex surfaces have different curvatures.

13. A flash device according to claim 6, wherein an optical axis of the exit surface is inclined or decentered in parallel with respect to an optical axis of said optical system.

14. A flash device according to claim 1, wherein the exit surface has a planar surface inclined with respect to an optical axis of said optical system, the inclined planar surface deflecting entire light beams exiting said optical system.

15. A flash device according to claim 1, further comprising means for scattering light emitted from said light source, said means being provided on or near the entrance surface.

16. A flash device according to claim 1, wherein the exit surface has a rectangular shape.

17. A flash device according to claim 1, wherein the entrance surface has a rectangular shape.

18. A flash device according to claim 1, wherein said optical system has a lens for gathering the light which exits from the exit surface.

19. A flash device according to claim 18, wherein the lens is a Fresnel lens.

20. A flash device according to claim 1, wherein said light source has a flash discharge tube which extends in a direction perpendicular to an optical axis of said optical system.

21. A flash device according to claim 20, wherein said optical system extends in the perpendicular direction and has a reflecting mirror for reflecting the light emitted from the flash discharge tube toward said transparent member.

22. A flash device according to claim 21, wherein said transparent member is a plate-shaped member parallel to a plane which contains the perpendicular direction, and wherein each of the entrance surface and the exit surface has a rectangular shape which is long in the perpendicular direction.

23. A flash device according to claim 22, wherein the following conditions are satisfied:

$H1 \leq DY \leq 2$ mm×$H2$; and $HL \leq DX \leq HL+8$ mm where HL is an arc length of the flash discharge tube, H1 and H2 are an inner diameter and an outer diameter of the flash discharge tube, respectively, DX is a length of the entrance surface in the perpendicular direction, and DY is a length of the entrance surface in a direction perpendicular to the perpendicular direction.

24. A flash device according to claim 22, wherein the following condition is satisfied:

$\{\sin^{-1}(1/n)\}/3 \leq \beta$ where $\beta$ is an inclination angle of the reflecting surface with respect to the entrance surface, or if the reflecting surface is a curved surface, an inclination angle of a tangent to the curved surface with respect to the entrance surface, and n is a refractive index of said transparent member.

25. A flash device according to claim 22, wherein the exit surface has a convex curved surface, and the following condition is satisfied:

$\alpha \leq 2\beta - \sin^{-1}((\sin\theta_{max})/n) + \sin^{-1}(1/n)$ where $\alpha$ is an inclination angle of a tangent to the convex curved surface with respect to a plane perpendicular to the entrance surface, $\beta$ is an inclination angle of the reflecting surface with respect to the entrance surface, or if the reflecting surface is a curved surface, an inclination angle of a tangent to the curved surface with respect to the entrance surface, $\theta_{max}$ is a maximum incident angle of the light emitted from said light source with respect to the entrance surface, and n is a refractive index of said transparent member.

26. A flash device according to claim 22, wherein said transparent member is made of plastic or glass.

27. A flash device according to claim 22, wherein the reflecting surface is formed by a surface which totally reflects the light, or a surface having a reflecting film.

28. A flash device according to claim 22, wherein the entrance surface has a positive refractive power.

29. A flash device according to claim 22, wherein the exit surface has a positive refractive power.

30. A flash device according to claim 29, wherein the entrance surface has a positive refractive power.

31. A flash device according to claim 30, wherein the exit surface has a convex surface having the positive refractive power in its central portion and an inclined plane surface in its marginal portion.

32. A flash device according to claim 30, wherein the exit surface has a convex surface having a positive refractive power.

33. A flash device according to claim 30, wherein the exit surface has a Fresnel lens having a positive refractive power.

34. A flash device according to claim 30, wherein the exit surface has a plurality of convex surfaces each having a positive refractive power.

35. A flash device according to claim 34, wherein the plurality of convex surfaces have different curvatures.

36. A flash device according to claim 30, wherein an optical axis of the exit surface is inclined or decentered in parallel with respect to an optical axis of said optical system.

37. A flash device according to claim 22, wherein the exit surface has a planar surface inclined with respect to an optical axis of said optical system, the inclined planar surface deflecting entire light beams exiting said optical system.

38. A flash device according to claim 22, further comprising means for scattering light emitted from said light source, said means being provided on or near the entrance surface.

39. A flash device according to claim 22, wherein said optical system has a lens for gathering the light which exits from the exit surface.

40. A flash device according to claim 39, wherein the lens is a Fresnel lens.

41. A photographing apparatus including a body having a flash device according to any of claims 1 to 40.

42. A photographing apparatus according to claim 41, wherein said flash device is movable.

43. A photographing apparatus according to claim 42, wherein said flash device is provided in a top portion of said body.

44. A photographing apparatus according to claim 41, further comprising a lens barrel.

45. A flash device comprising:
   a light source for providing a flash of light; and
   an optical system for projecting light emitted from said light source onto an object, said optical system having a transparent member which is tapered toward said light source, said transparent member having an entrance surface, an exit surface, and a reflecting surface lying between the entrance surface and the exit surface, said entrance surface and said exit surface being located on a straight extending optical axis, and a portion of the light emitted from said light source being made incident on the entrance surface and then exiting from the exit surface after having been reflected at the reflecting surface.

46. A flash device according to claim 1, wherein said entrance surface has a positive refractive power, and said transparent member is in the form of a plate, where the reflecting surface has an upper surface and a bottom surface each tapering toward said light source, and two side surfaces each tapering toward said light source.

47. A flash device according to claim 46, wherein the entrance surface has a positive refractive power.

48. A flash device according to claim 46, wherein the exit surface has a convex surface having the positive refractive power in its central portion and an inclined plane surface in its marginal portion.

49. A flash device according to claim 46, wherein the exit surface has a convex surface having a positive refractive power.

50. A flash device according to claim 46, wherein the exit surface has a Fresnel lens having a positive refractive power.

51. A flash device according to claim 46, wherein the exit surface has a plurality of convex surfaces each having a positive refractive power.

52. A flash device according to claim 51, wherein the plurality of convex surfaces have different curvatures.

53. A flash device according to claim 46, wherein an optical axis of the exit surface is inclined or decentered in parallel with respect to an optical axis of said optical system.

54. A flash device according to claim 46, wherein the exit surface has a planar surface inclined with respect to an optical axis of said optical system, the inclined planar surface deflecting entire light beams exiting said optical system.

55. A flash device according to claim 46, further comprising means for scattering light emitted from said light source, said means being provided on or near the entrance surface.

56. A flash device according to claim 46, wherein the exit surface has a rectangular shape.

57. A flash device according to claim 46, wherein the entrance surface has a rectangular shape.

58. A flash device according to claim 46, wherein said optical system has a lens for gathering light which exits from the exit surface.

59. A flash device according to claim 58, wherein the lens is a Fresnel lens.

60. A flash device according to claim 46, wherein said light source has a flash discharge tube which extends in a direction perpendicular to an optical axis of said optical system.

61. A flash device comprising:
   a light source for providing a flash of light, said light source comprising a flash discharge tube; and
   an optical system for projecting the light emitted from said light source onto an object, said optical system having a transparent member which is tapered toward said light source, said transparent member having an entrance surface, an exit surface, and a reflecting surface lying between the extrance surface and the exit surface, said entrance surface and said exit surface being located on a straight extending optical axis, and a portion of the light emitted from said light source being made incident on the entrance surface and then exiting from the exit surface after having been reflected at the reflecting surface, said transparent member being a plate having the exit surface elongated in a lengthwise direction of said flash discharge tube, said reflecting surface having an upper surface and a bottom surface, each tapering toward said light source, and two side surfaces each tapering toward said light source, and said exit surface having a convex surface curving along the lengthwise direction of said flash discharge tube.

62. A flash device according to claim 61, wherein said optical system extends in the perpendicular direction and has a reflecting mirror for reflecting light emitted from the flash discharge tube toward said transparent member.

63. A flash device according to claim 62, wherein said transparent member is a plate-shaped member parallel to a plane which contains the perpendicular direction, and wherein each of the entrance surface and the exit surface has a rectangular shape which is long in the perpendicular direction.

64. A flash device according to claim 63, wherein the following conditions are satisfied:

$$H1 \leq DY \leq 2mm \times H2;$$

and $$HL \leq DX \leq HL + 8 \text{ mm}$$

where HL is an arc length of the flash discharge tube, H1 and H2 are an inner diameter and an outer diameter of the flash discharge tube, respectively, DX is a length of the entrance surface in the perpendicular direction, and DY is a length of the entrance surface in a direction perpendicular to the perpendicular direction.

65. A flash device according to claim 63, wherein the following condition is satisfied:

$$\{\sin^{-1}(1/n)\}/3 \leq \beta$$

where β is an inclination angle of the reflecting surface with respect to the entrance surface, or if the reflecting surface is a curved surface, an inclination angle of a tangent to the curved surface with respect to the entrance surface, and n is a refractive index of the transparent member.

66. A flash device according to claim 63, wherein the exit surface has a convex curved surface, and the following condition is satisfied:

$$\alpha \leq 2\beta - \sin^{-1}((\sin \theta_{max})/n) + \sin^{-1}(1/n)$$

where α os an inclination angle of a tangent to the convex curved surface with respect to a plane perpendicular to the entrance surface, β is an inclination angle of the reflecting surface with respect to the entrance surface, or if the reflecting surface is a curved surface, an inclination angle of a tangent to the curved surface with respect to the entrance surface, $\theta_{max}$ is a maximum incident angle of the light emitted from said light source with respect to the entrance surface, and n is a refractive index of said transparent member.

67. A flash device according to claim 63, wherein said transparent member is made of plastic or glass.

68. A flash device according to claim 63, wherein the reflecting surface is formed by a surface which totally reflects the light, or a surface having a reflecting film.

69. A flash device according to claim 63, wherein the entrance surface has a positive refractive power.

70. A flash device according to claim 63, wherein the exit surface has a positive reflective power.

71. A flash device according to claim 70, wherein the entrance surface has a positive refractive power.

72. A flash device according to claim 71, wherein the exit surface has a convex surface having the positive refractive power in its central portion and an inclined plane surface in its marginal portion.

73. A flash device according to claim 71, wherein the exit surface has a convex surface having a positive refractive power.

74. A flash device according to claim 71, wherein the exit surface includes a Fresnel lens having a positive refractive power.

75. A flash device according to claim 71, wherein the exit surface has a plurality of convex surfaces each having a positive refractive power.

76. A flash device according to claim 75, wherein the plurality of convex surfaces have different curvatures.

77. A flash device according to claim 71, wherein an optical axis of the exit surface is inclined or decentered in parallel with respect to an optical axis of said optical system.

78. A flash device according to claim 63, wherein the exit surface has a planar surface inclined with respect to an optical axis of said optical system, the inclined planar surface deflecting entire light beams exiting said optical system.

79. A flash device according to claim 63, further comprising means for scattering light emitted from said light source, said means being provided on or near the entrance surface.

80. A flash device according to claim 63, wherein said optical system has a lens for gathering light which exits from the exit surface.

81. A flash device according to claim 80, wherein the lens is a Fresnel lens.

82. A flash device comprising:
a light source for providing a flash of light; and
an optical system for projecting light emitted from said light source onto an object, said optical system having a transparent member which is tapered toward said light source, said transparent member having an entrance surface, an exit surface, and a reflecting surface lying between the entrance surface and the exit surface, said entrance surface and said exit surface being located on a straight extending optical axis, and a portion of the light emitted from said light source being incident on the entrance surface and then exiting from the exit surface after having been reflected at the reflecting surface, wherein the reflecting surface has an upper surface and a bottom surface, each tapering toward said light source, and two side surfaces each tapering toward said ligth source.

* * * * *

UNITED STATES PATENT AND TRADEMARK OFFICE
CERTIFICATE OF CORRECTION

PATENT NO. : 6,078,752
DATED : June 20, 2000
INVENTOR(S) : Yoshiharu Tenmyo

It is certified that error appears in the above-identified patent and that said Letters Patent is hereby corrected as shown below:

Title page, [73] Assignee
"Canon Kabushiki Kaisha" should read --Canon Kabushiki Kaisha, Tokyo, Japan--.

Column 1,
Line 13, "all are" should read --are--.

Column 2,
Line 8, "i s" should read --is--.
Line 13, "th e" should read --the--.

Column 8,
Line 11, "LC" should read --Lc--.

Column 9,
Line 4, "$V_d$" should read --Ve--.

Column 12,
Line 4, " $N \cdot \theta = \{\sin^{-1}((\sin \alpha) n) - \sin^{-1}((\sin \beta_{c0}) n)\}/2$ " should read
-- $N \cdot \theta = \{\sin^{-1}((\sin \alpha) /n) - \sin^{-1}((\sin \beta_{c0}) n)\}/2$ --.
Line 26, " $(\sin\alpha)/n\}$ " should read -- $((\sin\alpha)/n)\}$ --.

Column 13,
Line 15, "the" should read --of the-- and "of which" should read --which--.

Column 18,
Line 22, "of" should read --of the--.
Line 62, "$R_{min}R=R/2$" should read --$R_{min}R=R2$--.

Column 20,
Line 19, "a" should read --α--.

Column 22,
Line 36, "to the" (second occurrence) should be deleted.
Line 58, "element" should read --elements--.

UNITED STATES PATENT AND TRADEMARK OFFICE
CERTIFICATE OF CORRECTION

PATENT NO. : 6,078,752
DATED : June 20, 2000
INVENTOR(S) : Yoshiharu Tenmyo

It is certified that error appears in the above-identified patent and that said Letters Patent is hereby corrected as shown below:

Column 25,
Line 26, "the" should be deleted.

Column 27,
Line 19, "the" should be --said--.
Line 25, "os" should read --is--.
Line 43, "reflective" should read --refractive--.

Column 28,
Line 45, "ligth" should read --light--.

Signed and Sealed this

Fourteenth Day of August, 2001

*Attest:*

NICHOLAS P. GODICI
*Attesting Officer*    *Acting Director of the United States Patent and Trademark Office*